(12) United States Patent
Tindell et al.

(10) Patent No.: US 12,711,305 B2
(45) Date of Patent: Aug. 18, 2026

(54) COMPUTER NETWORKED FILING ENGINE

(71) Applicant: Avalara, Inc., Seattle, WA (US)

(72) Inventors: John Tindell, Brighton (GB); Tobin Mathew, Epsom (GB); William Colborn, Brighton (GB); Albert Michael Boulus, Cary, NC (US); Anup Anil Parekh, Brighton (GB); Masa Karahashi, San Mateo, CA (US); Emmanuel Thangaraj, Morgan Hill, CA (US); Narasimha Paila, Mountain House, CA (US); Alex Huang, Cupertino, CA (US); Ngoc Anh Vu Carter, Brighton (GB); Swapnil Singh, Hove (GB); Patricia Oakley, Hove (GB); Matt Buckley, Seaford (GB); Graham Edwards, Pevensey (GB)

(73) Assignee: Avalara, Inc., Seattle, WA (US)

( * ) Notice: Subject to any disclaimer, the term of this patent is extended or adjusted under 35 U.S.C. 154(b) by 202 days.

(21) Appl. No.: 18/207,103

(22) Filed: Jun. 7, 2023

(65) Prior Publication Data

US 2023/0401175 A1 Dec. 14, 2023

Related U.S. Application Data

(60) Provisional application No. 63/410,146, filed on Sep. 26, 2022, provisional application No. 63/350,381, (Continued)

(51) Int. Cl.

| | |
|---|---|
| ***G06F 16/9532*** | (2019.01) |
| ***G06F 9/50*** | (2006.01) |

(Continued)

(52) U.S. Cl.
CPC .......... *G06F 40/174* (2020.01); *G06F 9/5083* (2013.01); *G06F 16/122* (2019.01); (Continued)

(58) Field of Classification Search
CPC .. G06F 16/9352; G06F 16/122; G06F 16/183; G06F 16/951; G06F 40/174; G06F 9/5083; G06Q 20/102; G06Q 40/02
(Continued)

(56) References Cited

U.S. PATENT DOCUMENTS

| | | | |
|---|---|---|---|
| 6,314,415 | B1 | 11/2001 | Mukherjee |
| 7,194,426 | B1 | 3/2007 | Box |

(Continued)

OTHER PUBLICATIONS

International Search Report and Written Opinion received for PCT Patent Application No. PCT/US23/24755, mailed on Aug. 4, 2023, 9 pages.

(Continued)

*Primary Examiner* — Joshua Bullock
(74) *Attorney, Agent, or Firm* — Jeremiah J. Baunach; Frontier IP Law PLLC

(57) ABSTRACT

A disclosed method may include receiving user information for electronically filing or updating an electronic data sheet that corresponds to a user and a domain; maintaining a record of past electronic activities by the user; electronically receiving interchange data associated with interchanges executed by the user; automatically generating the electronic data sheet for the user based on the user information and the interchange data, the electronic data sheet indicating a finalized amount of resources to be transmitted to the domain; and electronically adjusting an electronic value for the user according to a remittance risk determination that is based on the interchange data and the record of past electronic activities by the user, the adjusted electronic value indicating a maximum amount of resources for which an (Continued)

online software platform will transmit and receive protocols to enable providing by the online software platform the maximum amount of resources.

8 Claims, 21 Drawing Sheets

Related U.S. Application Data filed on Jun. 8, 2022, provisional application No. 63/350,343, filed on Jun. 8, 2022, provisional application No. 63/350,390, filed on Jun. 8, 2022.

(51) Int. Cl.

| | |
|---|---|
| ***G06F 16/11*** | (2019.01) |
| ***G06F 16/182*** | (2019.01) |
| ***G06F 16/951*** | (2019.01) |
| ***G06F 40/174*** | (2020.01) |
| ***G06Q 20/10*** | (2012.01) |
| ***G06Q 40/02*** | (2023.01) |

(52) U.S. Cl.

CPC .......... *G06F 16/183* (2019.01); *G06F 16/951* (2019.01); *G06F 16/9532* (2019.01); *G06Q 20/102* (2013.01); *G06Q 40/02* (2013.01)

(58) Field of Classification Search

USPC .......................................................... 707/827

See application file for complete search history.

(56) References Cited

U.S. PATENT DOCUMENTS

| | | | | |
|---|---|---|---|---|
| 7,603,301 | B1 | 10/2009 | Regan | |
| 7,783,536 | B2 | 8/2010 | William et al. | |
| 7,933,803 | B1 | 4/2011 | Nadler et al. | |
| 8,620,578 | B1 | 12/2013 | Brown et al. | |
| 8,725,407 | B2 | 5/2014 | Hurley et al. | |
| 9,760,915 | B2 | 9/2017 | Pavlou et al. | |
| 10,445,818 | B1 | 10/2019 | Chowdhary | |
| 10,769,611 | B2 | 9/2020 | Mcneel | |
| 11,087,411 | B2 | 8/2021 | Wang et al. | |
| 11,176,619 | B1 | 11/2021 | Ciaramitaro | |
| 2002/0111888 | A1 | 8/2002 | Stanley et al. | |
| 2002/0138765 | A1 | 9/2002 | Fishman et al. | |
| 2007/0136158 | A1 | 6/2007 | Rawlings et al. | |
| 2007/0136159 | A1 | 6/2007 | Rawlings et al. | |
| 2012/0036053 | A1 | 2/2012 | Miller | |
| 2012/0109792 | A1 | 5/2012 | Eftekhari et al. | |
| 2012/0136780 | A1 | 5/2012 | El-Awady et al. | |
| 2012/0239560 | A1 | 9/2012 | Pourfallah et al. | |
| 2013/0013471 | A1 | 1/2013 | Fishman | |
| 2014/0180883 | A1 | 6/2014 | Regan | |
| 2018/0232204 | A1* | 8/2018 | Ghatage | G06F 7/02 |
| 2021/0248526 | A1* | 8/2021 | Greenberg | G06Q 10/06316 |
| 2022/0006872 | A1* | 1/2022 | Kavounas | H04L 67/562 |
| 2022/0044334 | A1 | 2/2022 | Blaikie et al. | |
| 2023/0401108 | A1 | 12/2023 | Tindell et al. | |
| 2023/0401378 | A1 | 12/2023 | Boulus et al. | |
| 2023/0401635 | A1 | 12/2023 | Boulus et al. | |

OTHER PUBLICATIONS

International Search Report and Written Opinion received for PCT Patent Application No. PCT/US23/24756, mailed on Aug. 4, 2023, 9 pages.

International Search Report and Written Opinion received for PCT Patent Application No. PCT/US23/24757, mailed on Aug. 4, 2023, 9 pages.

International Search Report received for PCT Patent Application No. PCT/US23/24754, mailed on Aug. 25, 2023, 3 pages.

* cited by examiner

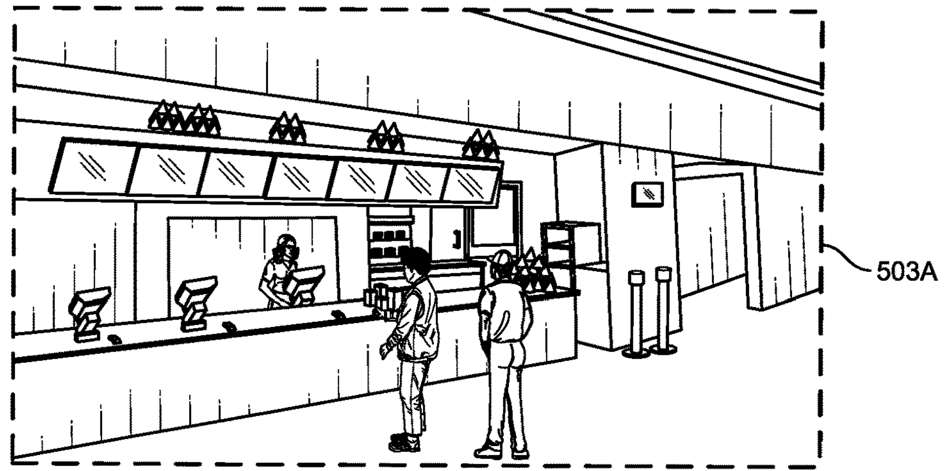
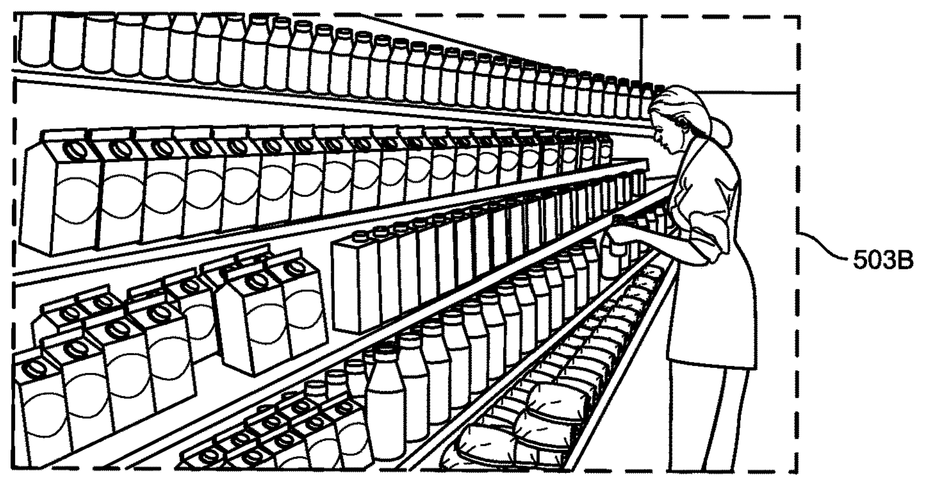
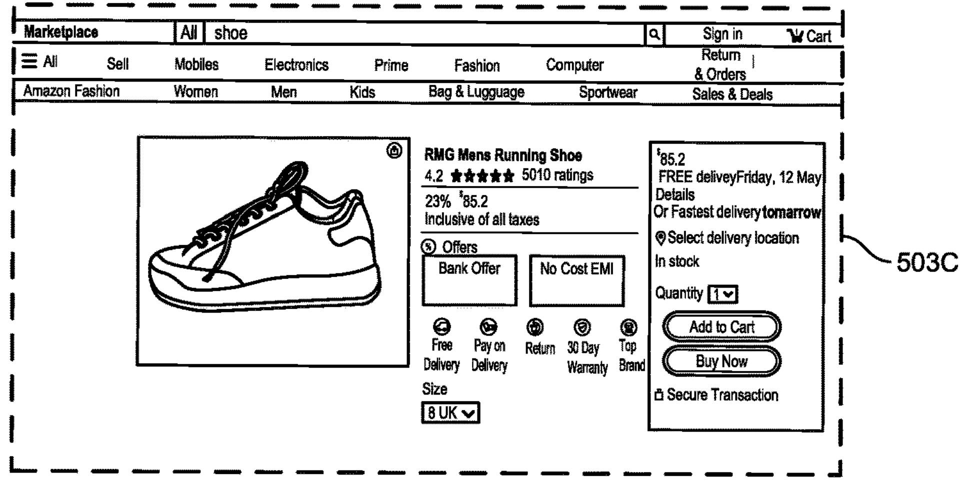
*FIG. 5B*

| Ref. | A (786) | B (788) | C (790) | D (792) | E (794) | F (796) | G (798) | H (799) |
|---|---|---|---|---|---|---|---|---|
| 700 | Type | Invoice Number | From Country | Tax Calculation Date | Invoice currency | Currency Exchange | xxxxxxxxxx | xxxxxxxxxx |
| 702 | Transaction | xxxxx-xxx-xxx-xxx-xxxxxxx | PL | 06,05,2022 | | | | 0 |
| 704 | Transaction | xxxxx-xxx-xxx-xxx-xxxxxxx | PL | 06,05,2022 | | | | -12.12 |
| 706 | Transaction | xxxxx-xxx-xxx-xxx-xxxxxxx | PL | 06,05,2022 | | | | 0 |
| 708 | Transaction | xxxxx-xxx-xxx-xxx-xxxxxxx | PL | 20,05,2022 | | | 117.9 | |
| 710 | Transaction | xxxxx-xxx-xxx-xxx-xxxxxxx | PL | 15,05,2022 | | | 18.73 | |
| 712 | Transaction | xxxxx-xxx-xxx-xxx-xxxxxxx | PL | 05,05,2022 | | | | 0 |
| 714 | Transaction | xxxxx-xxx-xxx-xxx-xxxxxxx | PL | 05,05,2022 | | | | -10 |
| 716 | Transaction | xxxxx-xxx-xxx-xxx-xxxxxxx | PL | 05,05,2022 | | | | 0 |
| 718 | Transaction | xxxxx-xxx-xxx-xxx-xxxxxxx | PL | 11,05,2022 | | | | 147.6 |
| 720 | Transaction | xxxxx-xxx-xxx-xxx-xxxxxxx | PL | 09,05,2022 | | | | 0 |
| 722 | Transaction | xxxxx-xxx-xxx-xxx-xxxxxxx | PL | 15,05,2022 | | | | -10 |
| 724 | Transaction | xxxxx-xxx-xxx-xxx-xxxxxxx | PL | 15,05,2022 | | | | -3 |
| 726 | Transaction | xxxxx-xxx-xxx-xxx-xxxxxxx | PL | 15,05,2022 | | | | 0 |
| 728 | Transaction | xxxxx-xxx-xxx-xxx-xxxxxxx | PL | 24,05,2022 | | | 18.73 | -11.59 |
| 730 | Transaction | xxxxx-xxx-xxx-xxx-xxxxxxx | PL | 04,05,2022 | | | | -3 |
| 732 | Transaction | xxxxx-xxx-xxx-xxx-xxxxxxx | PL | 24,05,2022 | | | | 0 |
| 734 | Transaction | xxxxx-xxx-xxx-xxx-xxxxxxx | PL | 24,05,2022 | | | | 0 |
| 736 | Transaction | xxxxx-xxx-xxx-xxx-xxxxxxx | PL | 24,05,2022 | | | | -9.83 |
| 738 | Transaction | xxxxx-xxx-xxx-xxx-xxxxxxx | PL | 24,05,2022 | | | | 0 |
| 730 | Transaction | xxxxx-xxx-xxx-xxx-xxxxxxx | PL | 24,05,2022 | | | | |
| 742 | Transaction | xxxxx-xxx-xxx-xxx-xxxxxxx | PL | 26,05,2022 | | | | 0 |
| 744 | Transaction | xxxxx-xxx-xxx-xxx-xxxxxxx | PL | 26,05,2022 | | | | -11.59 |
| 746 | Transaction | xxxxx-xxx-xxx-xxx-xxxxxxx | PL | 26,05,2022 | | | | -3 |
| 748 | Transaction | xxxxx-xxx-xxx-xxx-xxxxxxx | PL | 05,05,2022 | | | 117.9 | 0 |
| 750 | Transaction | xxxxx-xxx-xxx-xxx-xxxxxxx | PL | 05,05,2022 | | | | |
| 752 | Transaction | xxxxx-xxx-xxx-xxx-xxxxxxx | PL | 05,05,2022 | | | | -11 |
| 754 | Transaction | xxxxx-xxx-xxx-xxx-xxxxxxx | PL | 06,05,2022 | | | 18.73 | -1.5 |
| 756 | Transaction | xxxxx-xxx-xxx-xxx-xxxxxxx | PL | 00,05,2022 | | | | |
| 758 | Transaction | xxxxx-xxx-xxx-xxx-xxxxxxx | PL | 00,05,2022 | | | | 0 |
| 760 | Transaction | xxxxx-xxx-xxx-xxx-xxxxxxx | PL | 29,05,2022 | | | | -10.5 |
| 762 | Transaction | xxxxx-xxx-xxx-xxx-xxxxxxx | PL | 01,05,2022 | | | 117.9 | -3 |
| 764 | Transaction | xxxxx-xxx-xxx-xxx-xxxxxxx | PL | 01,05,2022 | | | | |
| 766 | Transaction | xxxxx-xxx-xxx-xxx-xxxxxxx | PL | 01,05,2022 | | | | |
| 768 | Transaction | xxxxx-xxx-xxx-xxx-xxxxxxx | PL | 04,05,2022 | | | | |
| 770 | Transaction | xxxxx-xxx-xxx-xxx-xxxxxxx | PL | 13,05,2022 | | | | 0 |
| 772 | Transaction | xxxxx-xxx-xxx-xxx-xxxxxxx | PL | 13,05,2022 | | | | -10 |
| 774 | Transaction | xxxxx-xxx-xxx-xxx-xxxxxxx | PL | 13,05,2022 | | | | 0 |
| 776 | Transaction | xxxxx-xxx-xxx-xxx-xxxxxxx | PL | 19,05,2022 | | | | 0 |
| 778 | Transaction | xxxxx-xxx-xxx-xxx-xxxxxxx | PL | 13,05,2022 | | | | 0 |
| 780 | Transaction | xxxxx-xxx-xxx-xxx-xxxxxxx | PL | 13,05,2022 | | | 117.9 | |
| 782 | Transaction | xxxxx-xxx-xxx-xxx-xxxxxxx | PL | 00,05,2022 | | | | 0 |
| 784 | Transaction | xxxxx-xxx-xxx-xxx-xxxxxxx | PL | 17,05,2022 | | | 18.73 | |

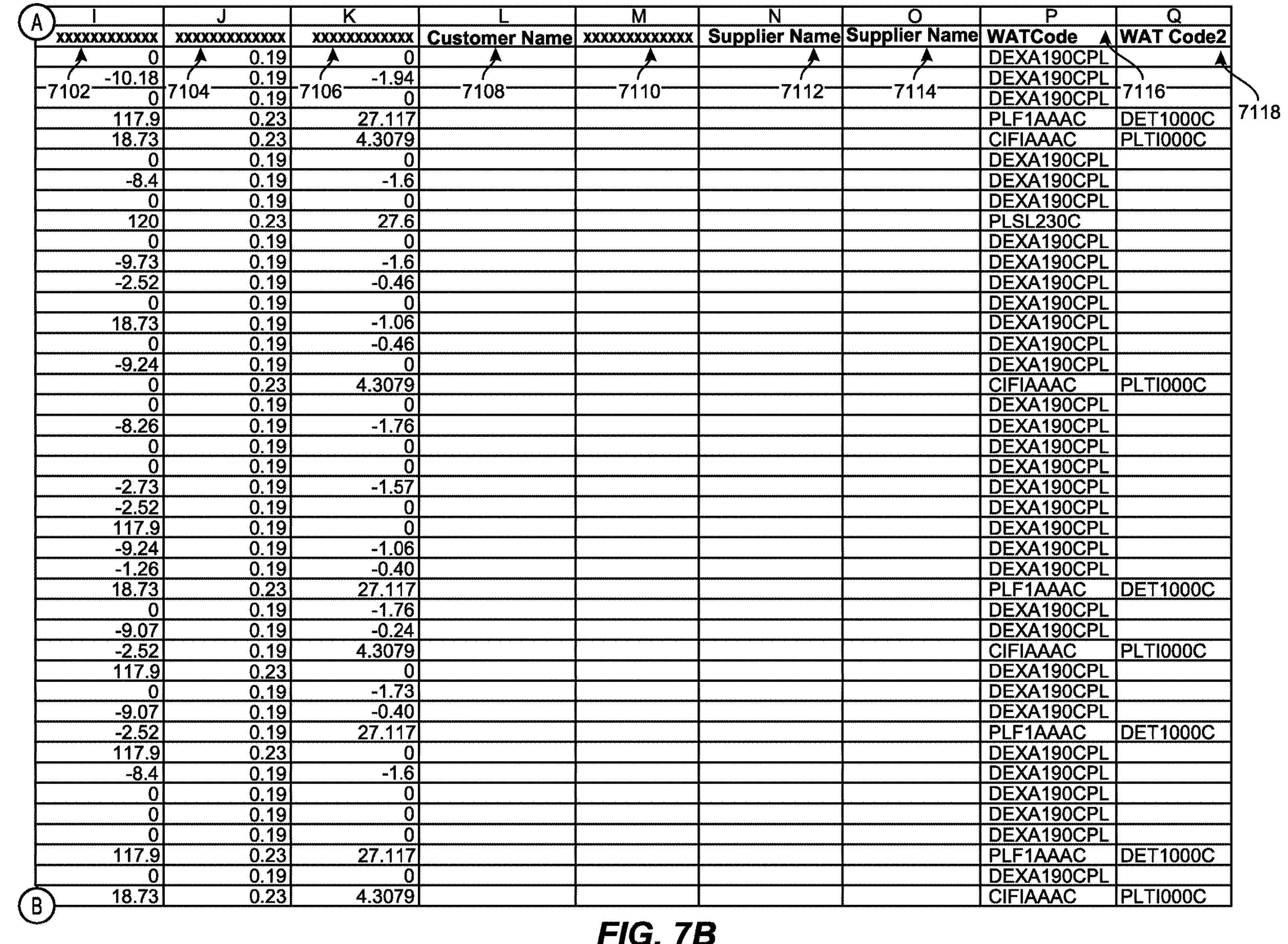

| I | J | K | L | M | N | O | P | Q |
|---|---|---|---|---|---|---|---|---|
| xxxxxxxxxxxx | xxxxxxxxxxxxx | xxxxxxxxxxxx | Customer Name | xxxxxxxxxxxxx | Supplier Name | Supplier Name | WATCode | WAT Code2 |
| 0 | 0.19 | 0 | | | | | DEXA190CPL | |
| -10.18 | 0.19 | -1.94 | | | | | DEXA190CPL | |
| 0 | 0.19 | 0 | | | | | DEXA190CPL | |
| 117.9 | 0.23 | 27.117 | | | | | PLF1AAAC | DET1000C |
| 18.73 | 0.23 | 4.3079 | | | | | CIFIAAAC | PLTI000C |
| 0 | 0.19 | 0 | | | | | DEXA190CPL | |
| -8.4 | 0.19 | -1.6 | | | | | DEXA190CPL | |
| 0 | 0.19 | 0 | | | | | DEXA190CPL | |
| 120 | 0.23 | 27.6 | | | | | PLSL230C | |
| 0 | 0.19 | 0 | | | | | DEXA190CPL | |
| -9.73 | 0.19 | -1.6 | | | | | DEXA190CPL | |
| -2.52 | 0.19 | -0.46 | | | | | DEXA190CPL | |
| 0 | 0.19 | 0 | | | | | DEXA190CPL | |
| 18.73 | 0.19 | -1.06 | | | | | DEXA190CPL | |
| 0 | 0.19 | -0.46 | | | | | DEXA190CPL | |
| -9.24 | 0.19 | 0 | | | | | DEXA190CPL | |
| 0 | 0.23 | 4.3079 | | | | | CIFIAAAC | PLTI000C |
| 0 | 0.19 | 0 | | | | | DEXA190CPL | |
| -8.26 | 0.19 | -1.76 | | | | | DEXA190CPL | |
| 0 | 0.19 | 0 | | | | | DEXA190CPL | |
| 0 | 0.19 | 0 | | | | | DEXA190CPL | |
| -2.73 | 0.19 | -1.57 | | | | | DEXA190CPL | |
| -2.52 | 0.19 | 0 | | | | | DEXA190CPL | |
| 117.9 | 0.19 | 0 | | | | | DEXA190CPL | |
| -9.24 | 0.19 | -1.06 | | | | | DEXA190CPL | |
| -1.26 | 0.19 | -0.40 | | | | | DEXA190CPL | |
| 18.73 | 0.23 | 27.117 | | | | | PLF1AAAC | DET1000C |
| 0 | 0.19 | -1.76 | | | | | DEXA190CPL | |
| -9.07 | 0.19 | -0.24 | | | | | DEXA190CPL | |
| -2.52 | 0.19 | 4.3079 | | | | | CIFIAAAC | PLTI000C |
| 117.9 | 0.23 | 0 | | | | | DEXA190CPL | |
| 0 | 0.19 | -1.73 | | | | | DEXA190CPL | |
| -9.07 | 0.19 | -0.40 | | | | | DEXA190CPL | |
| -2.52 | 0.19 | 27.117 | | | | | PLF1AAAC | DET1000C |
| 117.9 | 0.23 | 0 | | | | | DEXA190CPL | |
| -8.4 | 0.19 | -1.6 | | | | | DEXA190CPL | |
| 0 | 0.19 | 0 | | | | | DEXA190CPL | |
| 0 | 0.19 | 0 | | | | | DEXA190CPL | |
| 0 | 0.19 | 0 | | | | | DEXA190CPL | |
| 117.9 | 0.23 | 27.117 | | | | | PLF1AAAC | DET1000C |
| 0 | 0.19 | 0 | | | | | DEXA190CPL | |
| 18.73 | 0.23 | 4.3079 | | | | | CIFIAAAC | PLTI000C |

FIG. 7B

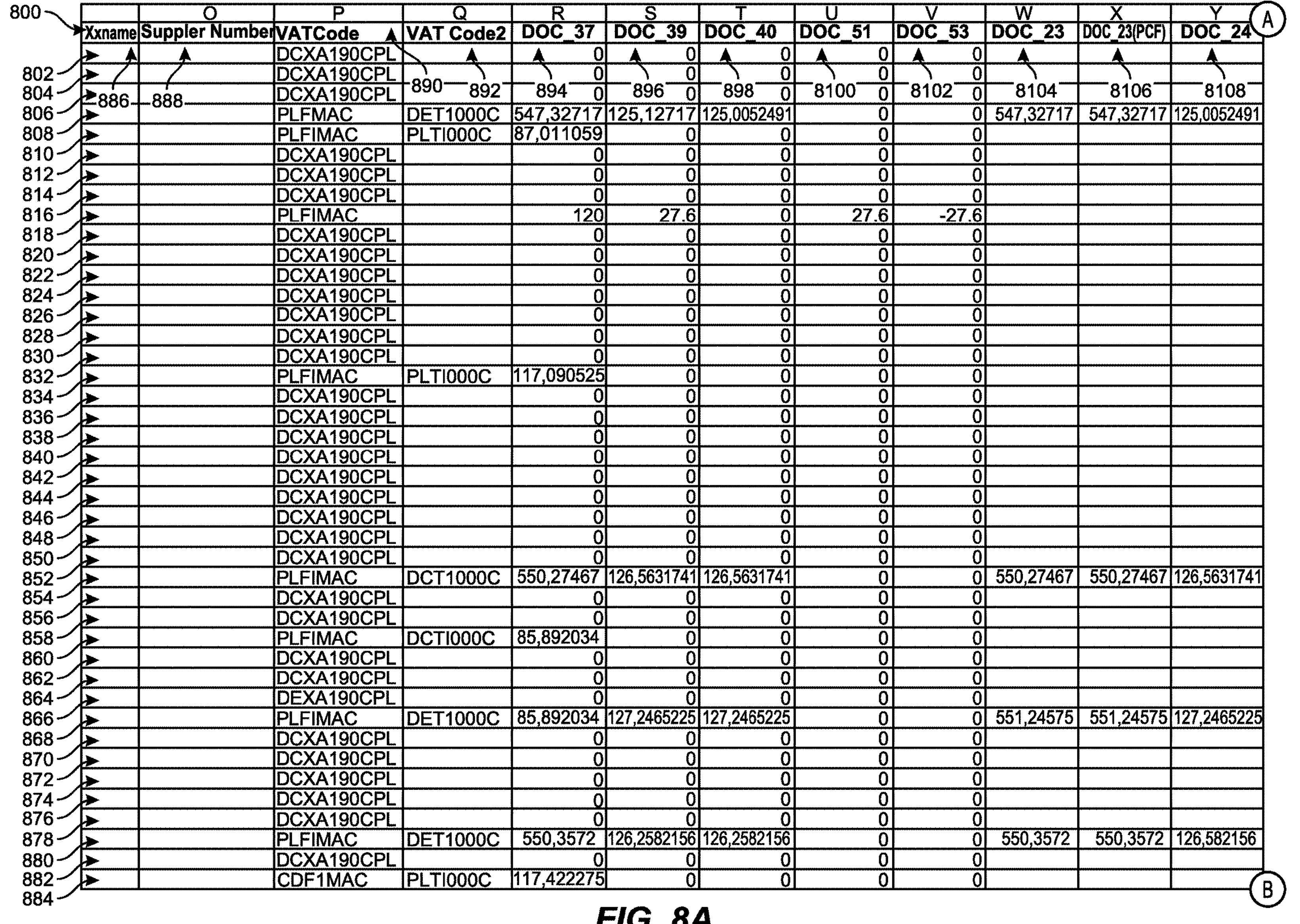

| | O | P | Q | R | S | T | U | V | W | X | Y |
|---|---|---|---|---|---|---|---|---|---|---|---|
| Xxname | Suppler Number | VATCode | VAT Code2 | DOC_37 | DOC_39 | DOC_40 | DOC_51 | DOC_53 | DOC_23 | DOC_23(PCF) | DOC_24 |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | PLFMAC | DET1000C | 547,32717 | 125,12717 | 125,0052491 | 0 | 0 | 547,32717 | 547,32717 | 125,0052491 |
| | | PLFIMAC | PLTI000C | 87,011059 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | PLFIMAC | | 120 | 27.6 | 0 | 27.6 | -27.6 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | PLFIMAC | PLTI000C | 117,090525 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | PLFIMAC | DCT1000C | 550,27467 | 126,5631741 | 126,5631741 | 0 | 0 | 550,27467 | 550,27467 | 126,5631741 |
| | | DCXA190CPL | | 0 | 0 | 0 | 0 | 0 | | | |
| | | DCXA190CPL | | 0 | 0 | 0 | 0 | 0 | | | |
| | | PLFIMAC | DCTI000C | 85,892034 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DEXA190CPL | | 0 | 0 | 0 | 0 | 0 | | | |
| | | PLFIMAC | DET1000C | 85,892034 | 127,2465225 | 127,2465225 | 0 | 0 | 551,24575 | 551,24575 | 127,2465225 |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | DCXA190CPL | | 0 | 0 | 0 | 0 | 0 | | | |
| | | PLFIMAC | DET1000C | 550,3572 | 126,2582156 | 126,2582156 | 0 | 0 | 550,3572 | 550,3572 | 126,582156 |
| | | DCXA190CPL | | 0 | 0 | 0 | 0 | 0 | | | |
| | | CDF1MAC | PLTI000C | 117,422275 | 0 | 0 | 0 | 0 | | | |

FIG. 8A

| Z | AA | AB | AC | AD | AE | AF | AG | AH | AI | AJ | AK | AL | AM | AN |
|---|---|---|---|---|---|---|---|---|---|---|---|---|---|---|
| DOC_24(PCF) | DOC_42 | DOC_42(PCF) | DOC_43 | DOC_43(PCF) | DOC_21 | DOC_21(PCF) | DOC_19 | DOC_19(PCF) | DOC_20 | DOC_20(PCF) | DOC_100 | | | |
| 8110 | 8112 | 8114 | 8116 | 8118 | 8120 | 8122 | 8124 | 8126 | 8128 | 8130 | 8132 | 8134 | 8136 | 8138 |
| 125,0052491 | 547,12717 | 547,12717 | 125,0052491 | 125,0052491 | | | | | | | | | | |
| | | | | | 117,011059 | 117,011059 | | | | | | | | |
| | | | | | | | | | | | | | | |
| | | | | | | | | | | | | | | |
| | | | | | | | | | | | | | | |
| | | | | | | | 120 | 120 | 27.6 | 27.6 | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | 117,090525 | 117,090525 | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| 126,5631741 | 550,27467 | 550,27467 | 126,5631741 | 126,5631741 | | | | | | | | | | |
| | | | | | | | | | | | | | | |
| | | | | | | | | | | | | | | |
| | | | | | 115,092004 | 115,092004 | | | | | | | | |
| | | | | | | | | | | | | | | |
| | | | | | | | | | | | | | | |
| | | | | | | | | | | | | | | |
| 127,2465225 | 551,24575 | 551,24575 | 127,2465225 | 127,2465225 | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| 126,582156 | 550,3572 | 550,3572 | 126,2582156 | 126,2582156 | | | | | | | | | | |
| | | | | | | | | | | | | | | |
| | | | | | 117,422275 | 117,422275 | | | | | | | | |

COMPUTER NETWORKED FILING ENGINE

TECHNICAL FIELD

The technical field relates to computer networks and automated electronic data sheet generation, management, and filing in computer network technology, as discussed in more detail below.

BRIEF SUMMARY

Individuals and organizations generally participate in interchanges with other entities. Such interchanges might number in the thousands, millions, or billions, for example. These interchanges might further trigger additional action steps that the individuals and organizations become effectively obligated to perform in response to these interchanges. Generally speaking, these next action steps may include, among other things, generating and appropriately filing electronic data sheets. These further action steps may be required by a domain at which one or more parties to each interchange is associated. Accordingly, such large numbers of interchanges may also be associated with large numbers of domains, and each of the domains might establish significantly different action steps to be performed in response to the interchanges. For example, each respective domain might establish significantly different rules, or other logic, for appropriately cataloguing, tracking, and/or recording corresponding interchanges, as well as different rules for performing next action steps in response to these interchanges, such as by preparing and appropriately filing corresponding electronic data sheets.

The massive number of individuals, organizations, interchanges, and/or associated domains, and the complications resulting from different domains having significantly different rules, thereby creates a challenge in terms of properly tracking and recording the interchanges, appropriately calculating or determining the next action steps, and/or appropriately preparing and filing the corresponding electronic data sheets with each respective domain in accordance with each respective domain's potentially unique or different set of rules.

Additionally or alternatively, one particular challenge arising from the massive number of individuals, organizations, interchanges, and/or associated domains is from the potential desire of individuals or organizations to appropriately prepare and file the electronic data sheets with reduced, minimal, or even zero further intervention or disturbance. In other words, these individuals and organizations may appropriately desire for the electronic data sheets to be automatically generated and filed, on behalf of the individuals or organizations, in a manner that minimizes the disturbance to these individuals or organizations. More specifically, these individuals or organizations may appropriately desire for one or more entities, and/or corresponding network computing systems, to provide or submit resources to respective domains, in accordance with the electronic data sheets and in accordance with the potentially unique rules of each domain, without the individuals or organizations being further contacted or disturbed. Nevertheless, when providing or submitting resources on behalf of an individual or organization, there can arise a risk of the resources being provided without the individual or organization thereafter compensating for this provisioning of resources within an appropriate amount of time. Accordingly, the present disclosure discloses risk-reduction technologies that may address and remediate this additional challenge.

Such risk-reduction technologies may include electronically determining an estimated amount of resources to be transmitted based on an analysis of the interchange data associated with interchanges executed by users for hundreds or thousands of remote entity systems over the network simultaneously or concurrently (which is impossible to do in the human mind) to provide more accurate and efficient computer network operations for electronic data sheet filing and transmission of resources for various systems on the network, including for the entity systems and devices of systems on which the electronic data sheets are electronically filed, thus improving the technology of computer networks and the technology of electronic datasheet filing and electronic transmission of resources.

In particular, such simultaneous and/or concurrent electronic determining of estimated amounts of resources to be transmitted based on an analysis of the interchange data associated with interchanges executed by users for hundreds or thousands of remote entity systems over the network increases the speed at which the electronic services are provided (as opposed to the systems waiting for them to be performed serially). This also reduces data flow over the computer network by avoiding the entity systems having to resend requests over the network to perform the electronic services to receive updated data regarding actual current amounts of resources available that would otherwise be performed by the service engine to transmit the resources.

Furthermore, such electronic filing of the generated electronic data sheets with domains automatically such that further contacting the one or more users for electronically filing the generated electronic data sheets is avoided beyond the initial setup also reduces data flow over the computer network by avoiding the entity systems having to transmit requests and other data over the network to perform electronic intermediate and follow-up tasks and provide updated data after the initial setup that would otherwise be required to enable the generation and filing of the electronic data sheets.

Such electronically filing of the generated electronic data sheets with domains automatically such that further contacting the users for electronically filing the generated electronic data sheets is avoided beyond the initial setup may be performed by a filing engine for hundreds or thousands of entities via hundreds or thousands of remote entity systems over the network simultaneously or concurrently (which is impossible to do in the human mind) to provide more accurate and efficient computer network operations for electronic data sheet filing for various systems on the network, including for the entity systems and devices of systems on which the electronic data sheets are electronically filed, thus improving the technology of computer networks and the technology of electronic datasheet filing.

In particular, such simultaneous and/or concurrent electronic generating and filing of the electronic data sheet being performed by the filing engine for hundreds or thousands of entities via hundreds or thousands of remote systems over the network increases the speed at which the electronic services are provided (as opposed to the systems waiting for them to be performed serially). This also reduces data flow over the computer network by avoiding the entity systems having to resend requests over the network to perform the electronic services and provide updated data due to lag times that would otherwise be experienced by the entity systems between when the original request was sent and when the electronic operations are able to be performed.

Thus, the systems and methods described herein for automated actions for electronically generating and filing of electronic data sheets, automated risk-reduction and electronic determining of estimated amounts of resources to be transmitted improves the functioning of computer or other hardware, such as by reducing the processing, storage, and/or data transmission resources needed to perform various tasks, including preparation and submission of electronic registration, thereby enabling the tasks to be performed by less capable, capacious, and/or expensive hardware devices, and/or be performed with less latency, and/or preserving more of the conserved resources for use in performing other tasks or additional instances of the same task.

In view of the above, the present disclosure provides technical improvements in computer networks and existing computerized systems to facilitate the generation and automatic filing of electronic data sheets.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 5B is a set of three diagrams showing illustrative examples of interchanges or transactions that may trigger one or more additional action steps to be performed, in accordance with the rules of a domain, by an automated electronic data sheet filing system.

FIGS. 7A-7B show an illustrative example of a reconciliation report.

FIGS. 8A-8B show another illustrative example of a reconciliation report.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
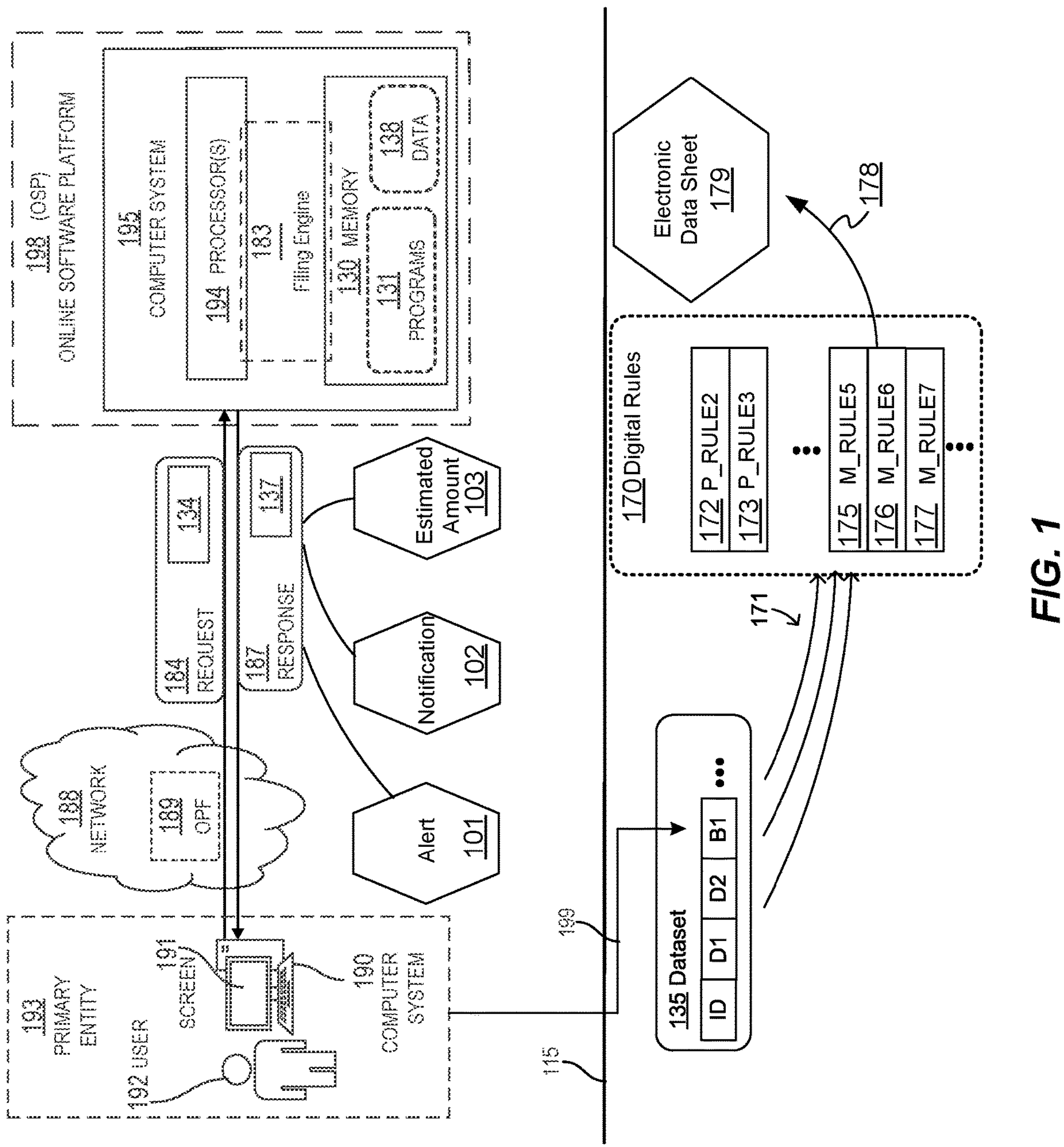
FIG. 1 is a diagram showing sample aspects of embodiments of the present disclosure that are improvements in automated computerized systems.

FIG. 1 is a diagram showing sample aspects of embodiments of the present disclosure. In particular, in an example embodiment, an OSP can automatically generate and/or file, via the filing engine 183, one or more electronic data sheets based on applying digital rules 170 to a dataset 135 of a client, such as primary entity 193. The OSP 198 may use data received via communication network 188 from a variety of sources, such as, for example, primary entity 193 and/or other entities and systems to produce electronic data sheet 179. Electronic data sheet 179 can be, or be a part of, a document, such as a document prepared for filing in a corresponding domain, as discussed further below, which can be made, created or prepared for the user 192, the primary entity 193, and/or one or more secondary or intermediary entities, etc. on the basis of one or more attributes of dataset 135. As such, in some embodiments, the electronic data sheet 179 is produced by a determination and/or a computation. The OSP 198 can electronically perform the associated calculation, determination, preparation and/or generation steps which may be associated with electronic data sheet 179. As part of one or more example methods for automatically generating the electronic data sheet (see FIG. 3A below), filing engine 183 may generate an alert 101 a notification 102, and/or an estimated amount 103, which may be transmitted back to primary entity 193 as part of one or more instances of a response 187, which may be generated in response to an originating request 184, as discussed in more detail below.

A thick line 115 separates this diagram, although not completely or rigorously, into a top portion and a bottom portion. Above the line 115 the emphasis is mostly on entities, components, their relationships, and their interactions, while below the emphasis is mostly processing of data that takes place often within one or more of the components above the line 115.

Above the line 115, a sample computer system 195 according to embodiments is shown. The computer system 195 has one or more processors 194 and a memory 130. The memory 130 stores programs 131 and data 138. The one or more processors 194 and the memory 130 of the computer system 195 can thereby implement a filing engine 183. Additional implementation details for the computer system 195 are given later in this document.

The computer system 195 can be located in "the cloud." In fact, the computer system 195 may optionally be implemented as part of an OSP 198. The OSP 198 can be configured to perform one or more predefined services, for example, via operations of the filing engine 183. Such services can be searches, determinations, computations, verifications, notifications, the transmission of specialized information, including data that effectuates payments or remits resources, the generation and transmission of documents, the online accessing other systems to effect registrations, and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of primary entity 193, which can be referred to also merely as an entity. In such instances, the user 192 can be an agent of the entity 193, and even within a physical site of the entity 193, although that is not necessary. In embodiments, the computer system 190 or other device of the user 192 or the entity 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), a private or public wireless cellular network (e.g., a fifth generation (5G) wireless network) or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the filing engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the filing engine 183 via a service call. The filing engine 183 may receive the request 184 with the payload 134. The filing engine 183 may then apply digital rules 170 to the payload 134 to determine a requested resource 179, form a payload 137 that is an aspect of the electronic data sheet 179, and then push, send, or otherwise cause to be transmitted a response 187 that carries the payload 137 to the connector. The connector reads the response 187, and forwards the payload 137 to the certain application.

In an alternative such architecture, a device remote to the filing engine 183, such as computer system 190, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the filing engine 183. Again, the filing engine 183 determines the requested resource 179, and sends an aspect of it back to the REST API. In turn, the REST API sends the response 187 that has the payload 137 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In embodiments, the computer system 195 receives one or more datasets. A sample received dataset 135 is shown below the line 115. The dataset 135 may be received by the computer system 195 in a number of ways. In some embodiments, one or more requests may be received by the computer system 195 via a network. In this example, a request 184 is received by the computer system 195 via the network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset 135. In this example the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control.

The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities such as primary entity 193, and/or intermediary entities, as indicated by arrow 199. (It should be noted that the arrows 199 describe a correspondence, but not the journey of data in becoming the received dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of whether an interchange with a secondary entity is via an intermediary entity, an indication of whether an electronic data sheet associated with the interchange is received via an intermediary entity, an indication of an identity or other characteristic of the intermediary entity, and so on. The dataset 135 may further have additional such values, as indicated by the horizontal dot-dot-dot to the right of the dataset 135. In some embodiments, each dataset, such as dataset 135 corresponds to one interchange. In some embodiments, the dataset 135 may correspond to a plurality of interchanges and include such respective values for each respective interchange of the plurality of interchange instances. In some embodiments, the dataset 135 has values that characterize attributes of each of the primary entity 193, a secondary entity, and also an intermediary entity, as discussed above, but that is not required. In some embodiments, the primary entity 193 may further include the intermediary entity or the secondary entity and communications described herein such as the request 184 and response 187 may be additionally or instead between the intermediary entity or secondary entity and the computer system 195.

In embodiments, stored digital rules 170 may be accessed by the computer system 195. These rules 170 are digital in that they are implemented for use by software. For example, these rules 170 may be implemented within programs 131 and data 138. The data portion of these rules 170 may alternately be implemented in memories in other places, which can be accessed via the network 188. These rules 170 may be accessed responsive to receiving a dataset, such as the dataset 135.

The digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital rules 170 may include additional rules and types of rules, as suggested by the vertical dot-dot-dots.

In embodiments, a certain one of the digital main rules may be identified from among the accessed stored rules by the computer system 195. In particular, values of the dataset 135 can be tested, according to arrows 171, against logical conditions of the digital main rules, as described later in this document. In this example, the certain main rule M_RULE6 176 is thus identified, which is indicated also by the beginning of an arrow 178 that is described in more detail later in this document. Identifying may be performed in a number of ways, and depending on how the digital main rules are implemented. An example is now described.

Figure 2:
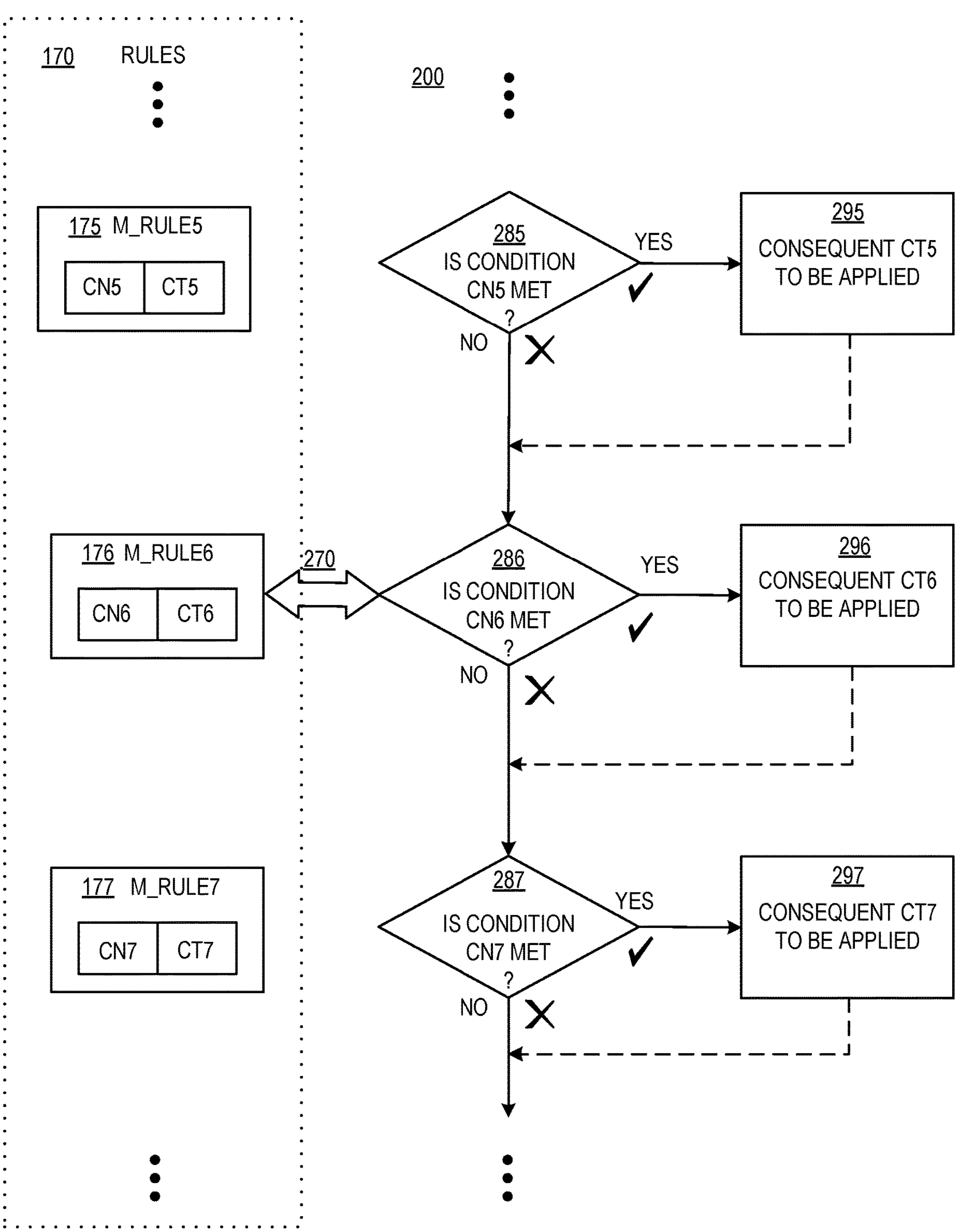
FIG. 2 is a diagram that repeats some of the digital main rules of FIG. 1 in more detail, and juxtaposes them with a flowchart portion for a sample method of how it may be recognized that conditions of a certain digital main rule can be met for its consequent to be applied, all according to embodiments of the present disclosure, and as an improvement in automated computerized systems.

Referring now also to FIG. 2, some of the digital main rules of digital rules 170 are repeated from FIG. 1 in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. One or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 200 of FIG. 2. According to successive decision diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 297, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE6 176 was thus identified. With reference to FIG. 2, the identification may have happened at operation 286 of the flowchart portion 200, at which time it was recognized that condition CN6 was met by a value of the dataset 135. This made the condition CN6 be the certain condition, the digital main rule M_RULE6 176 be the certain digital main rule, and the consequent CT6 be the certain consequent of the certain digital main rule M_RULE6 176. And the certain consequent CT6 is associated with the certain condition CN6, since both are included by the certain digital main rule 176. Therefore, according to operation 296, consequent CT6 is what happens or becomes applied, as described below.

A number of examples are possible for how to recognize that a certain condition of a certain digital rule is met by at least one of the values of the dataset. Depending on the type of data, different rules may be applied. For instance, the certain condition could define a boundary of a region that is within a space. The region could be geometric, and be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied. In particular, operation 286 may give the answer YES such that consequent CT6 is to be applied, and operation 287 may also give the answer YES such that consequent CT7 is to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 200, so as to test the applicability of fewer than all the rules according to arrows 171.

In the context of filing engine 183, another example is for how to recognize that a certain condition of a certain digital rule is met for the electronic data sheet is to be prepared, generated, and/or filed in association with one or more domains. If such a condition is met, the digital rules 170 may indicate to actually prepare, generate, and/or file the electronic data sheet in association with the corresponding domain.

In embodiments, an electronic data sheet may be produced for the dataset 135 by the computer system 195 applying the certain consequent of the certain digital main rule. The electronic data sheet can correspond to a computational result, a document, an item of value, a representation of an item of value, etc., made, created or prepared for the user 192, the primary entity 193, a secondary entity, an intermediary entity, etc., on the basis of the attribute. As such, in some embodiments, the electronic data sheet is produced by a determination and/or a computation. In the example of FIG. 1, the electronic data sheet 179 is produced for the dataset 135, by the computer system 195 applying the certain M_RULE6 176, and in particular its certain consequent CT6, as indicated by the arrow 178. In fact, sometimes applying the consequent is more simply stated as "applying the rule".

The electronic data sheet 179 may be produced in a number of ways. For example, the certain consequent can be applied to one or more of the values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1, the computer system 195 may recognize that an additional condition of an additional one of the accessed digital main rules 170 is met by at least one of the values of the dataset 135. In this example there would be no digital precedence rules, or the available digital precedence rules would not preclude both the certain digital main rule and the additional digital main rule from being applied concurrently. Such an additional digital main rule would have an additional consequent.

In such embodiments, the electronic data sheet may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the electronic data sheet may be produced by summing the first product and the second product.

In embodiments, a notification, such as notification 102, can be caused to be transmitted, e.g., via the network 188, by the computer system. A notification may be asynchronous, a flag, or an indication of information. For example, a notification may be an API call or part of one. In other embodiments, the notification may be a synchronous activity. The notification can include or can be about an aspect of the electronic data sheet 179. In the example of FIG. 1, notification 102 can be caused to be transmitted by the computer system 195, for example as an answer or other response to the received dataset 135. In some embodiments, notification 102 can also or instead be caused to be transmitted by the computer system 195, for example as an answer or other response to data received by the computer system 195 from other external sources, alone or in combination with data from dataset 135. In particular, the notification 102 may inform about one or more aspects of the electronic data sheet, namely that it has been generated or determined, where it can be found, what it is, or at least a portion or a statistic of its content, a rounded version of it, and so on. Of course, the planning should be that the recipient of the notification 102 understands what it is being provided. In such instances a need not be produced for the notification 102 to be transmitted. Of course, the planning should be that the recipient of the notification 102 understands what it is being provided.

The notification 102 can be transmitted to one of an output device and another device. The output device may be the screen of a local user or a remote user. The notification 102 may thus cause a desired image, message, or other such notification to appear on the screen, such as within a Graphical User Interface (GUI) and so on. In some embodiments, the notification 102 may not be displayed on the screen. The other device can be the remote device, from which the dataset 135 was received, as in the example of FIG. 1. In particular, the computer system 195 may cause the notification 102 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example, the single payload 137 encodes the entire notification 102, but that is not required. Similarly with what is written above about encoding datasets in payloads, the notification 102 instead may be provided via two or more payloads, or in other cases the notification 102, and at least one other notification, may be included in the same single payload. Within the electronic data sheet, it can be advantageous to embed in the payload 137 the identity value (ID) and/or one or more values of the dataset 135. This will help the recipient correlate the response 187 to the request 184, and therefore match the received electronic data sheet 179 as the answer or other response to the appropriate dataset or request.

In an example embodiment, there may be a plurality of interchanges between the primary entity 193 and one or more secondary entities. In some embodiments, such interchanges are between the primary entity 193 and one or more secondary entities via one or more intermediary entities. Each interchange may be associated with one or more respective domains of a plurality of domains. Also, each interchange may be associated with one or more respective intermediary entities, which handles or facilitates creation of the interchange. For example, an interchange may be performed by the primary entity 193 via a intermediary entity. In various embodiments, a domain may be a region defined by a boundary as discussed above or may be an entity representing or otherwise associated with the region. For example, the region could be geographic, within the space of a city, a county, a state, a country, a continent or the earth. A plurality of interchanges may result in a requirement that an electronic data sheet, such as an electronic reporting document associated with the primary entity 193, be prepared regarding an amount of resources due to one or more of the plurality of domains, that the document be sent to one or more of the plurality of domains and that resources possibly be remitted to one or more of the plurality of domains. A domain as used herein may refer to a geographic area or to one or more authorities (or computerized systems controlled by such authorities) that set or define rules or digital rules for such a geographic area or domain as described herein. The OSP 198 may perform or facilitate such electronic actions.

For example, in one embodiment, primary entity 193 may have an interchange with secondary entity and that particular interchange may be associated with one or more domains and with an electronic data sheet associated with the primary entity 193. The association of the interchange with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the interchange and/or one or more characteristics of the interchange may be defined or represented by values of dataset 135.

In some embodiments, for each interchange of the plurality of interchanges, the OSP 198 electronically identifies a rate to calculate an amount of resources due to one or more respective domains. For example, the primary entity 193 may send request 184 to the computer system 195 of OSP 198 for services that facilitate remitting resources due to one or more respective domains. The request 184 may include the existence or identification of the interchange and/or one or more characteristics of the interchange as part of payload 134. The filing engine 183 may then apply digital rules 170 to the interchange and/or one or more characteristics of the interchange to identify or otherwise determine the rate to calculate an amount of resources due to one or more respective domains associated with the interchange.

For example, digital precedence rule P_RULE2 172 may decide that rule M_RULE5 175 is to be applied when a particular condition is met. Digital precedence rule P_RULE2 172 may include a condition that indicates if a particular interchange is associated with a particular domain, then rule M_RULE5 175 is to be applied. The filing engine 183 may determine that the condition is met due to one or more values of dataset 135 indicating the particular interchange and that the particular interchange is associated with the particular domain. Thus, as a consequent of precedence rule P_RULE2 172, the filing engine 183 applies rule M_RULE5 175. Rule M_RULE5 175 may include a condition CN5 that indicates if a particular party to an interchange originates from a particular source or jurisdiction then, as consequent CT5, a particular rate is to be used to calculate an amount of resource due to that particular domain.

Referring again to FIG. 2, at decision diamond 285 it is determined that the condition CN5 is met (i.e., that the particular source of the electronic data sheet received for that interchange is associated with that particular domain) and thus, the particular rate is used to calculate an amount of resource due to that particular domain. Thus, by applying digital rules 170, the filing engine 183 identifies the rate to calculate an amount of resources due to one or more respective domains associated with the interchange, and also calculates an amount of resources due to at least one respective domain associated with the interchange based on the identified rate. In some embodiments, this calculated amount of resources due may be included by the filing engine 183 as part of the electronic data sheet 179 or one or more notifications, such as notification 102. The filing engine 183 may then form a payload 137 that includes the electronic data sheet 179, and then push, send, or otherwise cause to be transmitted a response 187 that carries the payload 137 to a device remote to the filing engine 183, such as computer system 190, a computer system of a domain, or a device of secondary entity, etc. Digital rules 170 may include multiple different digital rules for each type of interchange and different domains. In various embodiments, the notification 102 may comprise the response 187, or the response 187 may be included in the notification 102.

Figure 3A:
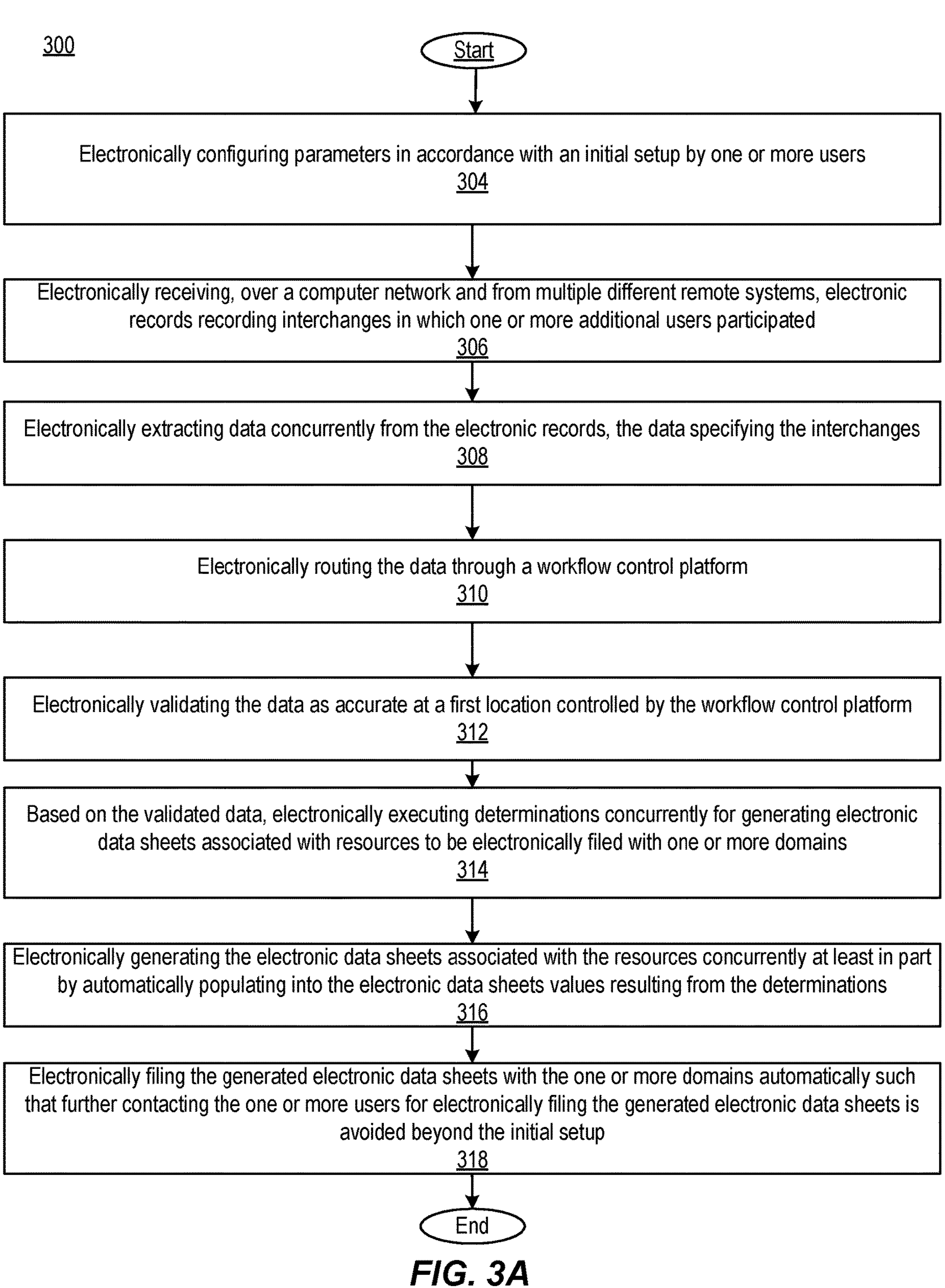
FIG. 3A is a flowchart illustrating a sample method for automated electronic data sheet generation according to embodiments of the present disclosure, which is directed to an improvement in automated computerized systems.

FIG. 3A is a flowchart illustrating a sample method 300 for automatically generating and filing electronic data sheets according to embodiments of the present disclosure that is an improvement in automated computerized systems.

At step 304, the filing engine electronically configures parameters in accordance with the initial setup by one or more users. For example, this step may include modifying a user profile for the one or more users by populating the user profile with identifying information submitted by the one or more users. Additionally, or alternatively, this step may include inputting any other suitable information useful for a user profile and/or useful for the initial setup of the automated electronic data sheet generation and submission workflows described in more detail below.

At step 306, the filing engine electronically receives, over a computer network and from multiple different remote systems, electronic records recording interchanges in which one or more additional users participated.

At step 308, the filing engine electronically extracts data concurrently from the electronic records.

At step 310, the filing engine electronically routes the data through a workflow control platform.

At step 312, the filing engine electronically validates the data as accurate a first location controlled by the workflow control platform.

At step 314, the filing engine, based on the validated data, electronically executes determinations concurrently for generating electronic data sheets associated with resources to be electronically filed with one or more domains.

At step 316, the filing engine electronically generates the electronic data sheets associated with the resources concurrently at least in part by automatically populating the electronic data sheets with values resulting from the determinations.

At step 318, the filing engine electronically files the generated electronic data sheets with the one or more domains automatically such that further contacting the one or more users for electronically filing the generated electronic data sheets is avoided beyond the initial setup.

Figure 3B:
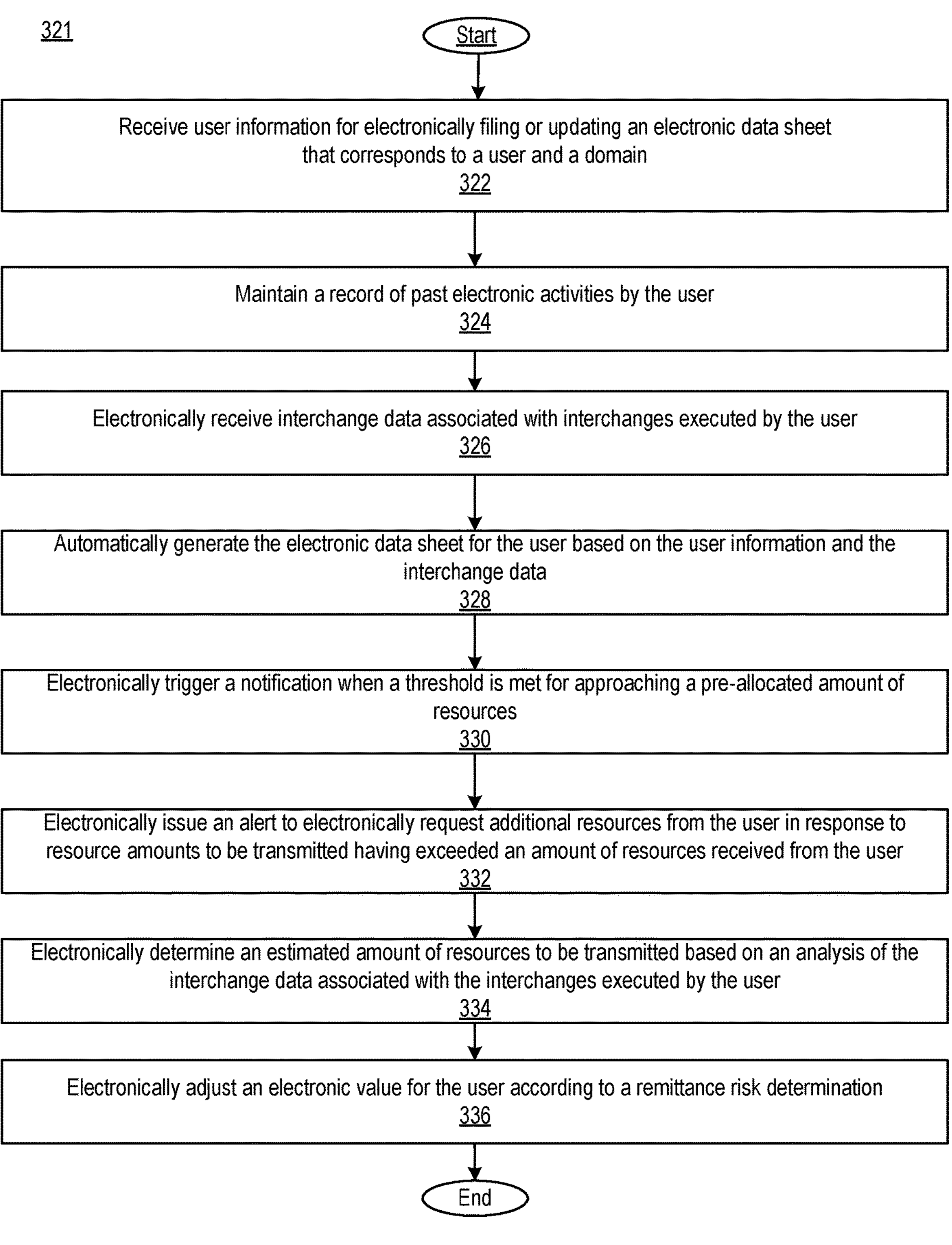
FIG. 3B is a flowchart illustrating a sample method for automated risk-reduction in the context of provisioning resources for corresponding electronic data sheets, according to embodiments of the present disclosure, which is directed to an improvement in automated computerized systems.

FIG. 3B is a flowchart illustrating a sample method 321 for the operation of risk-reduction technology according to embodiments of the present disclosure, and is an improvement in automated computerized systems.

At step 322, the filing engine receives user information for electronically filing or updating an electronic data sheet that corresponds to a user and a domain.

At step 324, the filing engine maintains a record of past electronic activities by the user.

At step 326, the filing engine electronically receives interchange data associated with interchanges executed by the user.

At step 328, the filing engine automatically generates the electronic data sheet for the user based on the user information and the interchange data.

At step 330, the filing engine electronically triggers a notification when a threshold is met for approaching a pre-allocated amount of resources.

At step 332, the filing engine electronically issues an alert to electronically request additional resources from the user in response to resource amounts to be transmitted having exceeded an amount of resources received from the user.

At step 334, the filing engine electronically determines an estimated amount of resources to be transmitted based on an analysis of the interchange data associated with the interchanges executed by the user.

At step 336, the filing engine electronically adjusts an electronic value for the user according to a remittance risk calculation.

Figure 4A:
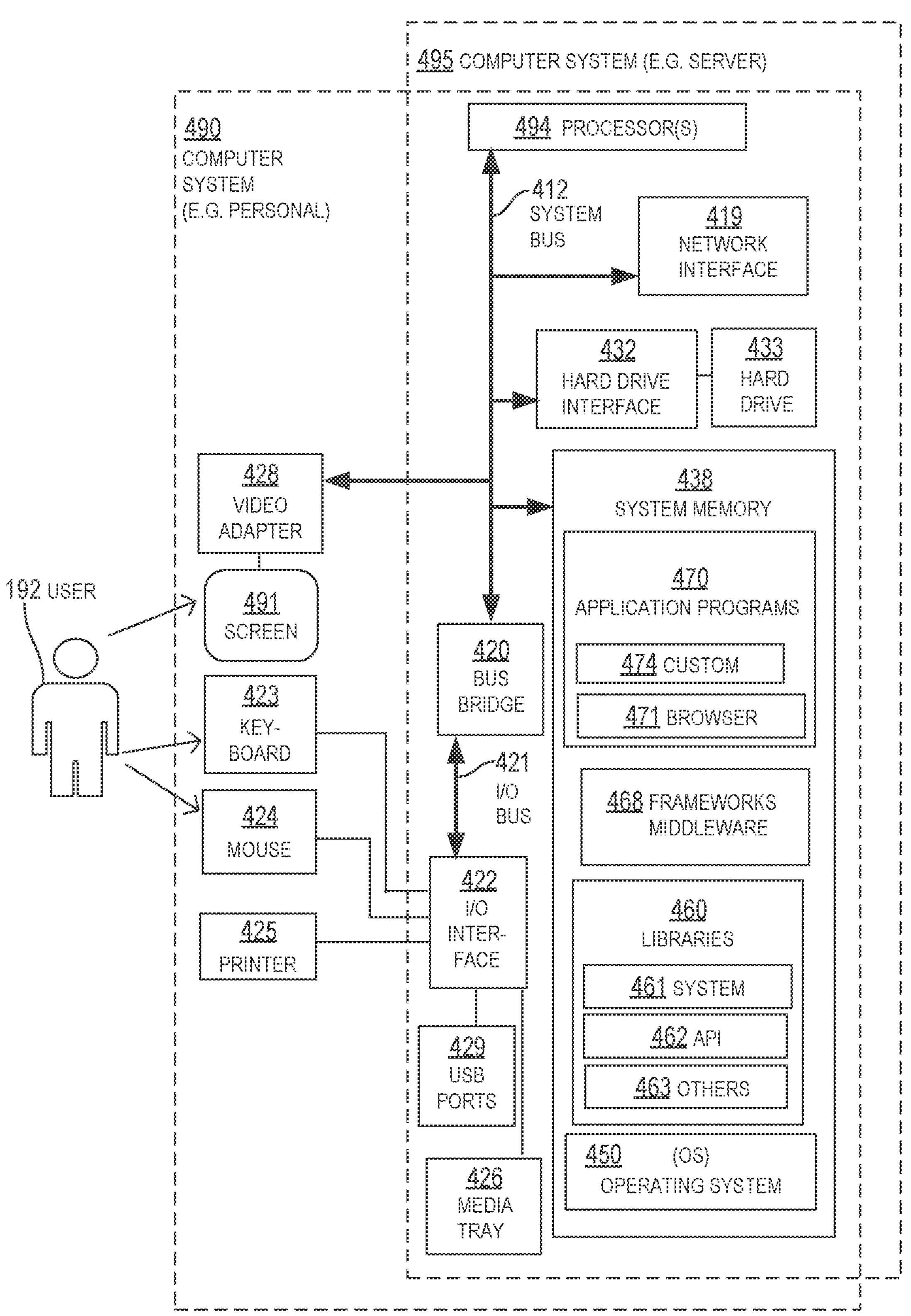
FIG. 4A is a block diagram showing additional components of sample computer systems according to embodiments of the present disclosure, which is directed to an improvement in automated computerized systems.

FIG. 4A is a block diagram showing additional components of sample computer systems according to embodiments of the present disclosure. FIG. 4 shows details for a sample computer system 495 and for a sample computer system 490. The computer system 495 may be a server, while the computer system 490 may be a personal device, such as a personal computer, a desktop computer, a personal computing device such as a laptop computer, a tablet computer, a mobile phone, and so on. Either type may be used for the computer system 195 or 190 of FIG. 1, a computer system that is part of OPF 189 and/or a computer system that is part of any entity or system shown in any of the figures of the present disclosure.

The computer system 495 and the computer system 490 have similarities, which FIG. 4 exploits for purposes of economy in this document. It will be understood, however, that a component in the computer system 495 may be implemented differently than the same component in the computer system 490. For instance, a memory in a server may be larger than a memory in a personal computer, and so on. Similarly, custom application programs 474 that implement embodiments may be different, and so on.

The computer system 495 includes one or more processors 494. The processor(s) 494 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 494 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific specialized machines, or specific specialized components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 495, or the computer system 490, are not intended to be exhaustive. Rather, they are representative, for highlighting essential components that can be used with embodiments.

The computer system 495 also includes a system bus 412 that is coupled to the processor(s) 494. The system bus 412 can be used by the processor(s) 494 to control and/or communicate with other components of the computer system 495.

The computer system 495 additionally includes a network interface 419 that is coupled to system bus 412. Network interface 419 can be used to access a communications network, such as the network 188. Network interface 419 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 495 also includes various memory components. These memory components include memory components shown separately in the computer system 495, plus cache memory within the processor(s) 494. Accordingly, these memory components are examples of non-transitory machine-readable media. The memory components shown separately in the computer system 495 are variously coupled, directly or indirectly, with the processor (s) 494. The coupling in this example is via the system bus 412.

Instructions for performing any of the methods or functions described in this document may be stored, completely or partially, within the memory components of the computer system 495, etc. Therefore, one or more of these non-transitory computer-readable media can be configured to store instructions which, when executed by one or more processors 494 of a host computer system such as the computer system 495 or the computer system 490, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 495 include a non-volatile hard drive 433. The computer system 495 further includes a hard drive interface 432 that is coupled to the hard drive 433 and to the system bus 412.

The memory components of the computer system 495 include a system memory 438. The system memory 438 includes volatile memory including, but not limited to, cache memory, registers and buffers. In embodiments, data from the hard drive 433 populates registers of the volatile memory of the system memory 438.

In some embodiments, the system memory 438 has a software architecture that uses a stack of layers, with each layer providing a particular functionality. In this example the layers include, starting from the bottom, an Operating System (OS) 450, libraries 460, frameworks/middleware 468 and application programs 470, which are also known as applications 470. Other software architectures may include less, more or different layers. For example, a presentation layer may also be included. For another example, some mobile or special purpose operating systems may not provide a frameworks/middleware 468.

The OS 450 may manage hardware resources and provide common services. The libraries 460 provide a common infrastructure that is used by the applications 470 and/or other components and/or layers. The libraries 460 provide functionality that allows other software components to perform tasks more easily than if they interfaced directly with the specific underlying functionality of the OS 450. The libraries 460 may include system libraries 461, such as a C standard library. The system libraries 461 may provide functions such as memory allocation functions, string manipulation functions, mathematical functions, and the like.

In addition, the libraries 460 may include API libraries 462 and other libraries 463. The API libraries 462 may include media libraries, such as libraries to support presentation and manipulation of various media formats such as MPEG4, H.264, MP3, AAC, AMR, JPG, and PNG. The API libraries 462 may also include graphics libraries, for instance an OpenGL framework that may be used to render 2D and 3D in a graphic content on the screen 491. The API libraries 462 may further include database libraries, for instance SQLite, which may support various relational database functions. The API libraries 462 may additionally include web libraries, for instance WebKit, which may support web browsing functionality, and also libraries for applications 470.

The frameworks/middleware 468 may provide a higher-level common infrastructure that may be used by the applications 470 and/or other software components/modules. For example, the frameworks/middleware 468 may provide various Graphic User Interface (GUI) functions, high-level resource management, high-level location services, and so forth. The frameworks/middleware 468 may provide a broad spectrum of other APIs that may be used by the applications 470 and/or other software components/modules, some of which may be specific to the OS 450 or to a platform.

The application programs 470 are also known more simply as applications and apps. One such app is a browser 471, which is a software that can permit the user 192 to access other devices in the internet, for example while using a Graphic User Interface (GUI). The browser 471 includes program modules and instructions that enable the computer system 495 to exchange network messages with a network, for example using Hypertext Transfer Protocol (HTTP) messaging.

The application programs 470 may include one or more custom applications 474, made according to embodiments. These can be made so as to cause their host computer to perform operations according to embodiments disclosed herein. Of course, when implemented by software, operations according to embodiments disclosed herein may be implemented much faster than may be implemented by a human mind if they can be implemented in the human mind at all; for example, tens or hundreds or millions of such operations may be performed per second according to embodiments, which is much faster than a human mind can do. Such speed of operations, and thus the use of such computing systems and networks, are integral to the embodiments described herein because such operations would be practically useless unless they are able to be applied to hundreds or thousands of computer network clients simultaneously or concurrently across computer networks and to the vast volumes of data that change in real-time provided by such computer network clients. Implementing a practical application of the embodiments described herein to hundreds or thousands of computer network clients simultaneously or concurrently across computer networks on which they operate and to the vast volumes of data that change in real-time provided by such computer network clients is impossible to do in the human mind.

Other such applications 470 may include a contacts application, a word processing application, a location application, a media application, a messaging application, and so on. Applications 470 may be developed using the ANDROID™ or IOS™ Software Development Kit (SDK) by an entity other than the vendor of the particular platform, and may be mobile software running on a mobile operating system such as IOS™, ANDROID™, Win phones, or other mobile operating and/or portable computing systems. The applications 470 may use built-in functions of the OS 450, of the libraries 460, and of the frameworks/middleware 468 to create user interfaces for the user 192 to interact with.

The computer system 495 moreover includes a bus bridge 420 coupled to the system bus 412. The computer system 495 furthermore includes an input/output (I/O) bus 421 coupled to the bus bridge 420. The computer system 495 also includes an I/O interface 422 coupled to the I/O bus 421.

For being accessed, the computer system 495 also includes one or more Universal Serial Bus (USB) ports 429. These can be coupled to the I/O interface 422. The computer system 495 further includes a media tray 426, which may include storage devices such as CD-ROM drives, multimedia interfaces, and so on.

The computer system 490 may include many components similar to those of the computer system 495, as seen in FIG. 4. In addition, a number of the application programs may be more suitable for the computer system 490 than for the computer system 495.

The computer system 490 further includes peripheral input/output (I/O) devices for being accessed by a user more routinely. As such, the computer system 490 includes a screen 491 and a video adapter 428 to drive and/or support the screen 491. The video adapter 428 is coupled to the system bus 412.

The computer system 490 also includes a keyboard 423, a mouse 424, and a printer 425. In this example, the keyboard 423, the mouse 424, and the printer 425 are directly coupled to the I/O interface 422. Sometimes this coupling is wireless or may be via the USB ports 429.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 494.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Figure 4B:
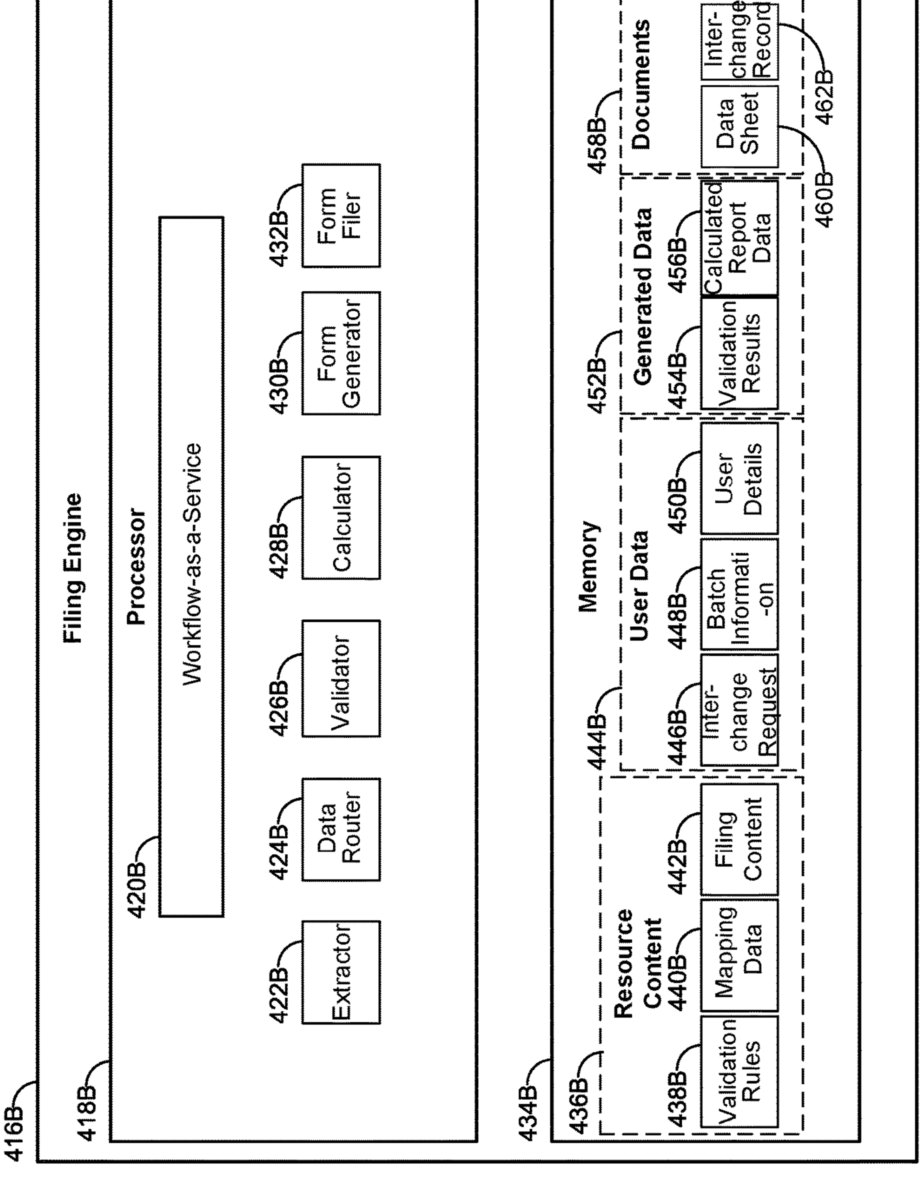
FIG. 4B is a block diagram showing additional components of sample file engines according to embodiments of the present disclosure, which is directed to an improvement in automated computerized systems.

FIG. 4B shows a diagram 400B of an example filing engine 416B, which may correspond to filing engine 183. As further shown in this diagram, filing engine 416B may further include a processor 418B and a memory 434B. Processor 418B, when executing one or more instances of computer-executable code that are stored on, and/or retrieved from memory 434B, may include functional components including a workflow as a service 420B, an extractor 422B, a data router 424B, a validator 426B, a calculator 428B, a form generator 430B, and a form filer 432B.

Similarly, as further shown in this figure, memory 434B may further include resource content 436B, customer data 444B, generated data 452B, and documents 458B. Moreover, in terms of composition relationships, resource content 436B may further include validation rules 438B, mapping data 440B, and filing content 442B. User data 444B may further include an interchange request 446B, batch information 448B, and user details 450B. Generated data 452B may further include validation results 454B and calculated report data 456B. Lastly, documents 458B may further include one or more instances of a data sheet 460B and one or more interchange records 462B.

Generally speaking, workflow as a service 420B may orchestrate one or more operations to be performed by the remaining functional components shown within processor 418B. Moreover, these functional components may generally map to, or correspond to, one or more steps of method 300. For example, extractor 422B may perform step 308 of electronically extracting data concurrently from the electronic records. Similarly, data router 424B may perform step 310 of electronically routing the data through a workflow control platform, which may be orchestrated or managed by workflow as a service 420B. Validator 426B may perform step 312 of electronically validating the data as accurate at a first location controlled by the workflow control platform. When performing step 312, validator 426B may reference validation rules 438B and produce validation results 454B. Calculator 428B may perform step 314 of electronically executing determinations concurrently for generating electronic data sheets associated with the resources to be electronically filed with one or more domains. When performing step 314, calculator 428B may reference one or more of resource content 436B, user data 444B, generated data 452B, and documents 458B. Form generator 430B may perform step 316 of electronically generating the electronic data sheets associated with the resources concurrently at least in part by automatically populating the electronic data sheets, including one or more instances of data sheet 460B, with values resulting from the determinations. Lastly, form filer 432B may perform step 318 of electronically filing the generated electronic data sheets with the one or more domains automatically such that further contacting the one or more users for electronically filing the generated electronic data sheets is avoided beyond the initial setup.

Operational Examples—Use Cases

The above-mentioned embodiments have one or more uses. Aspects presented below may be implemented as was described above for similar aspects. (Some, but not all, of these aspects have even similar reference numerals.)

Figure 5A:
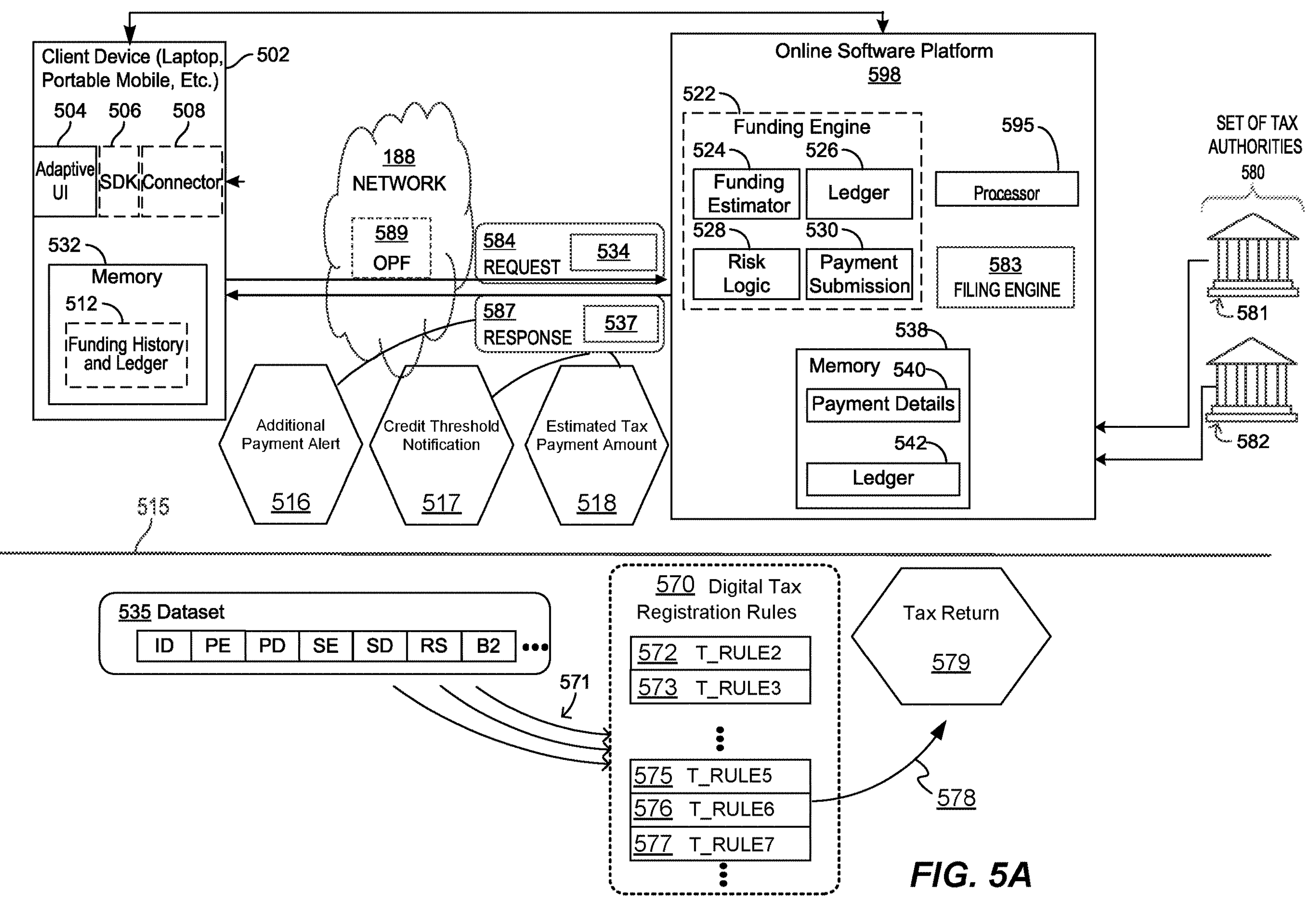
FIG. 5A is a diagram of sample aspects for describing operational examples and use cases of embodiments of the present disclosure that are improvements in automated computerized systems.

FIG. 5A is a diagram of sample aspects for describing operational examples and use cases of embodiments of the present disclosure that are improvements in automated computerized systems. As an example use case, the primary entity 193 of FIG. 1 may be a seller of goods or services who uses the electronic services of the OSP 598 to calculate a tax obligation, such as sales tax or value added tax, on transactions of the seller in real-time as the transactions occur as well for preparation and sending of an associated tax return 579 document for a corresponding transaction. In the process of the OSP 598 providing such services, filing engine 583 may automatically generate and produce the corresponding tax return 579 documents, and these processes may be performed at a massive scale and/or in parallel, as discussed further below. Thus, the systems and methods described herein for automated actions for automatically generating and filing tax return(s) 579 resulting from data produced by an OSP improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task.

As shown, OSP 598 may further include a funding engine 522, which may further include a funding estimator 524, a ledger 526, risk logic 528, and a payment submission component 530. OSP 598 may also include an instance of memory 538, which may further include payment details 540 and the ledger 542. These various components will be discussed in more detail in connection with FIG. 14.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.

FIG. 5A is diagram for an operational example and use case where tax return 579 includes a tax obligation of a seller, an intermediary entity (e.g., a marketplace) and/or a secondary entity (e.g., a customer), due to a transaction. The use case may also include the preparation and sending of an associated tax return 579 document for the transaction. In the present example, the transaction may be made via an intermediary entity that handles the transaction between the seller and the secondary entity via communication by the intermediary entity with the secondary entity. The transaction may include some or all of the data comprising the communication between the intermediary entity and the secondary entity. For example, values that characterize attributes of the transaction may be extracted from the communication such as price, fees and/or or rate for the transaction; taxes for the transaction; address or location of the transaction; identification of the seller, secondary entity and/or intermediary entity; a contract or agreement between the seller and another entity; a contract or agreement regarding collection or remitting of taxes for the transaction; other terms of the transaction; etc. In some embodiments, the communication may be made via network 188. In some instances, some or all of the data comprising the communication may be sent directly to the OSP 598 from the intermediary entity as part of dataset 535. In such embodiments, the transaction would be directly between the seller and the secondary entity instead of being made via the intermediary entity.

It will be recognized that aspects of FIG. 5A have similarities with aspects of FIG. 1. Portions of such aspects may be implemented as described for analogous aspects of FIG. 1. In particular, a thick line 515 separates FIG. 5A, although not completely or rigorously, into a top portion and a bottom portion. Above the line 515 the emphasis is mostly on entities, components, their relationships, and their interactions, while below it the emphasis is mostly processing of data that takes place often within one or more of the components above the line 515.

Above the line 515, a computer system is shown, which is used to help customers, such as a user, with tax compliance. Further in this example, OSP 598 is part of an OSP 598 that is implemented as a workflow as a service provider, such as workflow as a service 420B, for being accessed by the user online. Alternately, the functionality of OSP 598 may be provided locally to a user.

The user may be standalone. The user may use a client device 502 that has features an adaptive UI 504, an software development kit 506, and/or a connector 508. Client device 502 may also feature memory 532, which can include a funding history and ledger 512, as discussed in more detail below in connection with FIG. 14. In embodiments, the user and the client device 502 are considered part of the seller. The seller can be a business, such as a seller of items, a reseller, a buyer, and so on. In such instances, the user can be an employee, a contractor, or otherwise an agent of the seller. In use cases, the secondary entity is a buyer and together they are performing the buy-sell transaction. The buy-sell transaction may involve an operation, such as an exchange of data to form an agreement. This operation can be performed in person, or over the network 188, etc. In such cases the seller can even be an online seller, but that is not necessary. The transaction will have data that is known to the seller, similarly with what was described by the interchange of FIG. 1. In the present example, the transactions may be made via an intermediary entity.

In a number of instances, the user, the secondary seller and/or the intermediary entity use software applications to manage their business activities, such as sales, resource management, production, inventory management, delivery, billing, and so on. The user, the seller, and/or the intermediary entity may further use accounting applications to manage purchase orders, reservations, bookings, sales invoices, refunds, payroll, accounts payable, accounts receivable, and so on. Such software applications, and more, may be used locally by the user or intermediary entity, or from an Online Processing Facility (OPF) 589 that has been engaged for this purpose by the user, the seller, and/or intermediary entity. In such use cases, the OPF 589 can be a Mobile Payments system, a Point Of Sale (POS) system, an Accounting application, an Enterprise Resource Planning (ERP) system or provider, an e-commerce provider, an electronic marketplace, a Customer Relationship Management (CRM) system, and so on. In some embodiments, the OPF may be, or be used by, the intermediary entity.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a country, of a state/province, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's tax agency, b) set up internal processes for collecting sales tax in accordance with the sales tax rules of the tax authority, c) maintain records of the sales transactions and of the collected sales tax in the event of a subsequent audit by the taxi agency, d) periodically prepare a form ("tax return 579") that includes an accurate determination of the amount of the money owed to the tax authority as sales tax because of the sales transactions, e) file the tax return 579 with the tax authority by a deadline determined by the tax authority, and f) pay ("remit") that amount of money to the tax authority. In such cases, the filing and payment frequency and deadlines are determined by the tax authority.

A technical challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the local authority for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various countries, regions, provinces/states, counties, cities, municipalities, special taxing jurisdictions, and so on. In fact, there are over 10,000 different tax jurisdictions in the US alone, with many partially overlapping.

Third, in some instances no tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a region, state/province or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Even where a seller might not have reached any of the thresholds for economic nexus, a number of tax jurisdictions are promulgating marketplace facilitator laws that sometimes use such thresholds. According to such laws, intermediaries that are characterized as marketplace facilitators per laws of the respective tax jurisdiction have an obligation, instead of the seller, to collect sales tax on behalf of their sellers, and remit it to the respective tax authority. The situation becomes even more complex when a seller sells via such an intermediary.

To help with such complex determinations and solve such technical problems, OSP 598 may include specialized device for tax compliance as disclosed herein. OSP 598 may have one or more processors 595 and memory 540, for example, as was similarly described for the computer system 195 of FIG. 1. OSP 598 thus implements a filing engine 583 to make the determinations of tax obligations, including the preparation, generation, and/or filing of corresponding tax return(s) 579, which can be performed at massive scale and/or in parallel.

OSP 598 may further store locally entity data, which may include user data, such as customer data and/or seller data. The entity data may include profile data of the customer and transaction data from which a determination of a tax obligation is desired. In the online implementation of FIG. 5A, the OSP 598 has a database for storing the entity data, including the seller data. This entity data may be inputted by the user, and/or caused to be downloaded or uploaded by the user from the client device 502, from an intermediary entity or from the OPF 589, or extracted from the client device 502 or from the intermediary entity or from the OPF 589, and so on. In other implementations, a simpler memory configuration may suffice for storing the entity data.

For a specific determination of a tax obligation, OSP 598 may receive one or more datasets. A sample received dataset 535 is shown just below line 515, which can be similar to what was described for the dataset 135 of FIG. 1. In this example, the client device 502 transmits a request 584 that includes a payload 534, and the dataset 535 is received by OSP 598 parsing the received payload 534. In this example the single payload 534 encodes the entire dataset 535, but that is not required, as mentioned earlier.

In this example, the dataset 535 has been received because it is desired to determine any tax obligations arising from a corresponding buy-sell transaction. Accordingly, in this example the sample received dataset 535 has a value ID for an identity of the dataset 535 and/or the transaction. The dataset 535 also has a value PE for the name of the seller or the user, which can be the seller making sales transactions, some online. The dataset 535 further has a value PD for relevant data of the seller or the user, such as an address, place(s) of business, prior nexus determinations with various tax jurisdictions, and so on. The dataset 535 also has a value SE for the name of the secondary entity, which can be the buyer. The dataset 535 further has a value SD for relevant data of the secondary entity, entity-driven exemption status, and so on. The dataset 535 has a value B2 for the sale price of the item sold.

The dataset 535 further has a value RS that includes a unique identifier that contains or identifies information identifying or regarding a revenue source system for revenue received for the transaction and the location(s) of one or more properties being rented on the system. The dataset 535 may fewer values or have additional values, as indicated by the dot-dot-dot in the dataset 535. These values may characterize further attributes, such as characteristics of data identifying of or otherwise relating to a license or registration required for the transaction, a date and possibly also time of the transaction, and so on.

The digital tax registration rules 570 have been created so as to accommodate tax rules that the set 580 of different tax authorities 581, 582 . . . promulgate within the boundaries of their tax jurisdictions and to indicate when and how to prepare and file corresponding tax return 579 documents. In FIG. 5A, five sample digital tax registration rules are shown, namely T_RULE2 572, T_RULE3 573, T_RULE5 575, T_RULE6 576 and T_RULE7 577. Additional digital tax registration rules 570 are suggested by the vertical dot-dot-dots. Similarly with FIG. 1, some of these digital tax rules may be digital main rules that determine the tax return 579, while others can be digital precedence rules that determine which of the digital main rules is to be applied in the event of conflict. In some use cases, digital main rules may be about a sales tax or use tax being owed due to the transaction at a certain percentage of the purchase price. Digital precedence rules may be digital tax rules that determine whether particular digital tax rules are to be applied for origin-based or destination-based jurisdictions, how to override for diverse taxability of individual items, for temporary tax holidays, for exemptions from having to pay sales tax based on who the buyer is, and also based on nexus, and so on. In the present example, digital precedence rules may be digital tax registration rules that determine whether particular digital tax registration rules are to be applied.

Similarly with FIG. 1, these digital tax registration rules 570 can be implemented or organized in different ways. In some use cases they can be organized with conditions and consequents, such as was described earlier in this document. Such conditions may relate to geographical boundaries, sources of revenue, effective dates, and so on, for determining where and when a digital tax rule or tax rate is to be applied. These conditions may be expressed as logical conditions with ranges, dates, other data, and so on. Values of the dataset 535 can be iteratively tested against these logical conditions according to arrows 571. In such cases, the consequents may indicate one or more tax obligations, such as to indicate different types of taxes that are due, rules, rates, exemption requirements, reporting requirements, remittance requirements, etc.

In this example, a certain digital tax rule T_RULE6 576 is shown as identified and used, which is indicated also by the beginning of an arrow 578. Identifying may be performed responsive to the values of the dataset 535, which are shown as considered for digital tax registration rules 570 by arrows 571. For example, it can be recognized that a condition of the digital tax rule T_RULE6 576 is met by one or more of the values of the dataset 535. As such, OSP 598 may produce the tax return 579 document, which is akin to producing the electronic data sheet 179 of FIG. 1. OSP 598 may also file or otherwise send (or cause to be filed or sent) the tax return 579 document to one or more of the applicable tax authorities in the set of tax authorities 580 via network 188. The tax return 579 can be produced by OSP 598 applying the certain digital tax rule T_RULE6 576, as indicated by the arrow 578. In this example, the consequent of the identified certain digital tax rule T_RULE6 576 may specify that a tax is due, the amount is to be determined by a multiplication of the sale price of the value B2 by a specific rate, the tax return 579 form that needs to be prepared and filed, a date by which it needs to be filed, and so on.

In an example embodiment, OSP 598 causes an additional payment alert 516, a credit threshold notification 517, and/or an estimated tax payment amount 518 to be transmitted. Consistent with method 321, discussed above in connection with FIG. 3B, Additional payment alert 516 may refer to step 332 of method 321, at which point an alert is electronically issued to electronically request additional resources from the user in response to resource amounts to be transmitted having exceeded an amount of resources received from the user. Credit threshold notification 517 may refer to the notification transmitted at step 330 when a threshold is met for approaching a pre-allocated amount of resources. Estimated tax payment amount 518 can similarly refer to step 334, at which point an estimated amount of resources is electronically determined and transmitted based on an analysis of the interchange data associated with the interchanges executed by the user, as further discussed above. In the context of FIG. 5A, these interchanges can correspond to the buy-sell transaction outlined above. Generally speaking, these items of information may be sent as part of one or more instances of response 587 including its payload 537.

FIG. 5B shows three separate illustrative examples of interchanges, or transactions, that may be performed in connection with method 300 and method 321, and these correspond to a diagram 503A, diagram 503B, and a diagram 503C. In particular, diagram 503A shows an individual purchasing some food at a fast food restaurant. Diagram 503B shows a woman purchasing some milk at a grocery store. And diagram 503C shows a user purchasing a shoe from an online marketplace. In each of these cases, interchanges or transactions are being performed better further recorded and potentially uploaded to an online software platform, such as OSP 598. These interchanges or transactions can furthermore trigger one or more instances of tax obligations, and the preparation and filing of corresponding tax returns, and the submission of corresponding resources or payments, which can be facilitated by the performance of method 300 and/or method 321, as discussed above and discussed in more detail below.

Figure 6A:
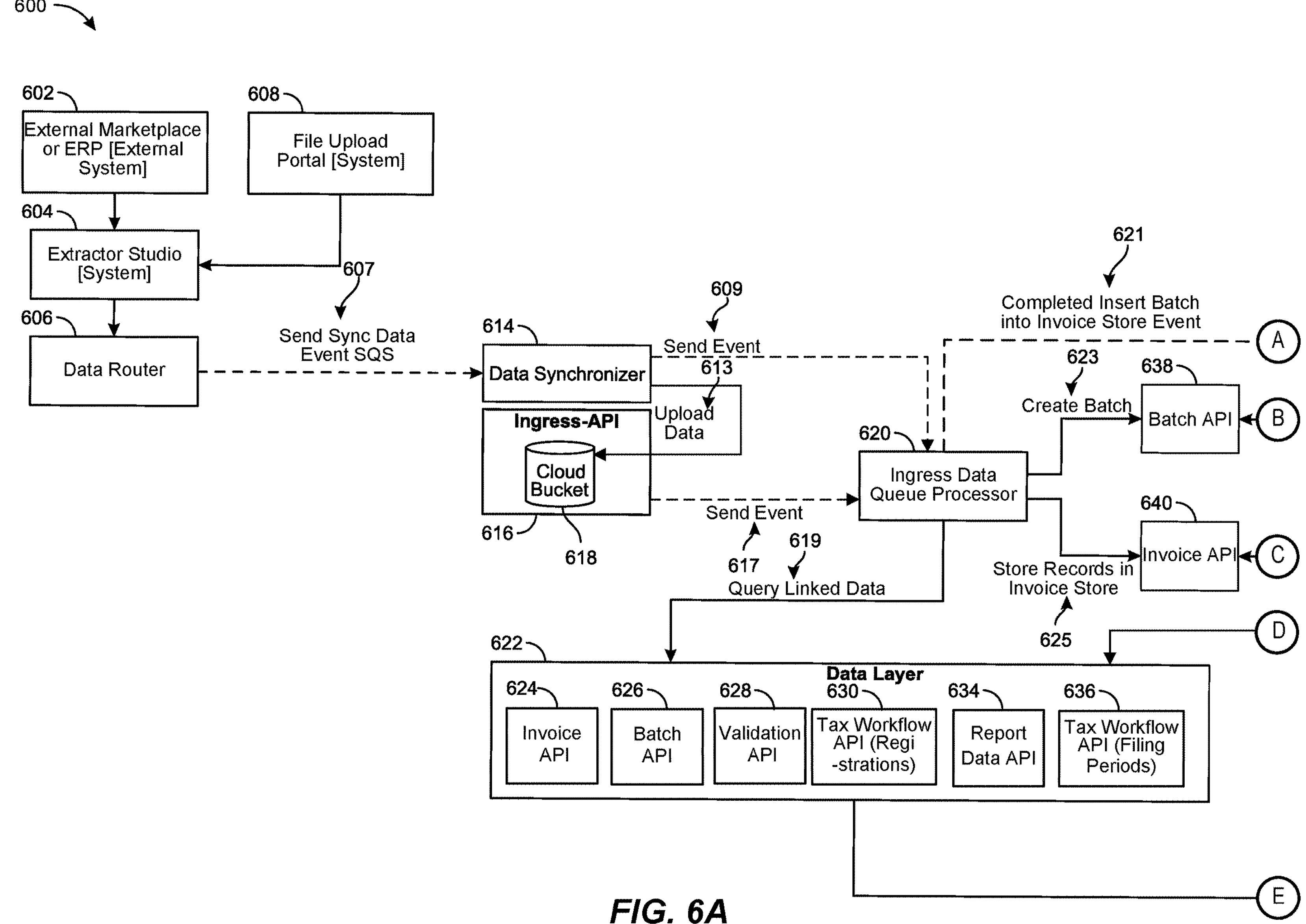
FIGS. 6A-6C show a more detailed workflow diagram corresponding to the filing engine of FIG. 1.
Figure 6B:
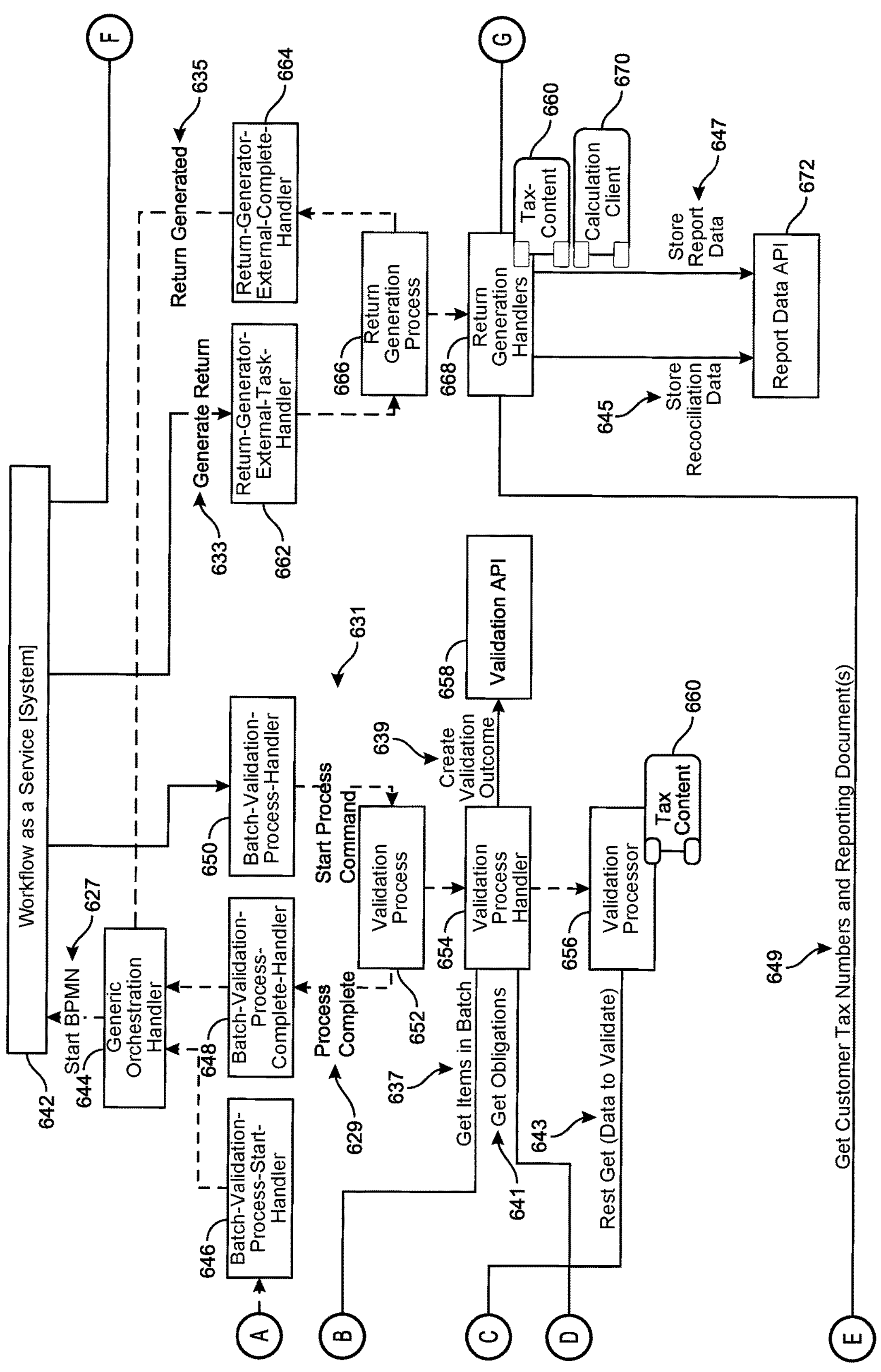
Figure 6C:
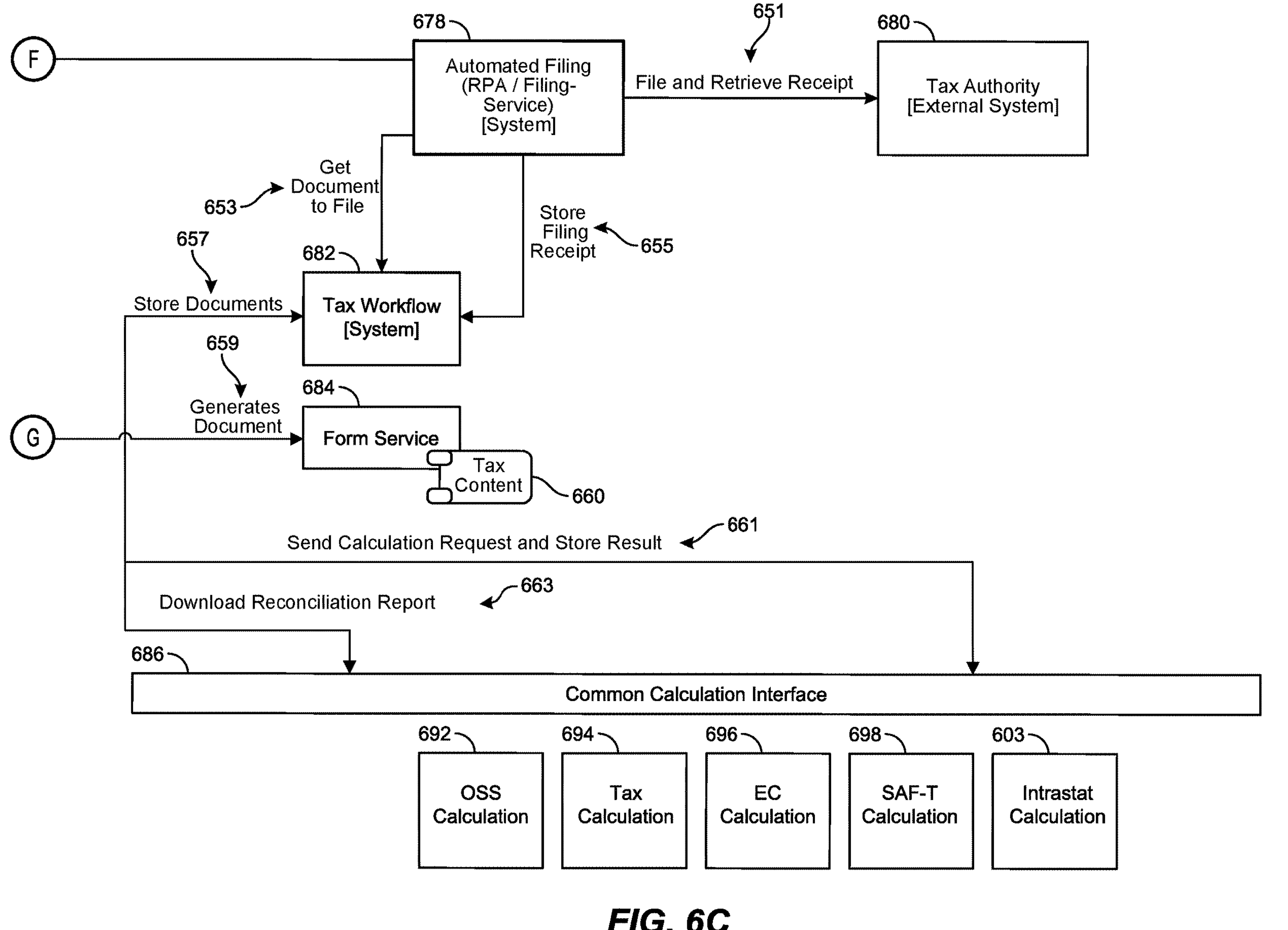

FIGS. 6A-6C together collectively show an overall system 600 that may facilitate the performance of method 300 and/or method 321. As shown, overall system 600 may include a multitude of different components and subcomponents, and these various components can be aggregated or summarized in terms of higher-level functionality. In particular, system 600 may facilitate the following major items of higher-level functionality: (i) extraction, (ii) data routing, (iii) data validation, (iv) form generation, (v) calculation, and/or (iv) form filing. Data extraction can be performed in part in connection with an external marketplace or ERP 602, which can correspond to client device 502 and/or the computing device of an intermediary, such as a vendor, marketplace, and/or third-party facilitating one or more buy-sell transactions. By way of illustrative example, an online marketplace might facilitate execution of one or more such transactions. The online marketplace might also transact or partner with an online software platform, such as OSP 598, to benefit from the efficiencies and improvements of tax compliance software and/or services provided by OSP 598. Accordingly, external marketplace 602 might upload corresponding transaction information to an extractor studio 604 associated with, or disposed within, OSP 598. FIG. 6A also further illustrates how, as an alternative to external marketplace 602 directly uploading such transaction information, external marketplace 602 and/or any other suitable entity, such as a vendor, may use an out-of-band file upload portal 608 to effectively upload the same transaction information.

Upon receiving transaction information from external marketplace 602 or file upload 608, an extractor studio 604 may extract relevant data for subsequent processing throughout the remainder of system 600. Generally speaking, extractor studio 604 may extract more relevant data from less relevant data and/or discard irrelevant data for the purposes of generating electronic data sheets. Extractor studio 604 may be configured with extractor tools to extract corresponding data. The functionality of extractor studio 604 reflects the reality that not all of the bits of information uploaded from external marketplace 602 and/or file upload portal 608 may be relevant or necessary for the performance of method 300 and/or method 321 using system 600. Accordingly, extractor studio 604 may selectively extract only those bits of information that are (sufficiently) relevant, useful and/or necessary for the purposes of performing method 300 and/or method 321.

After the performance of extraction, the next instance of higher-level functionality that may be performed by system 600 corresponds to data routing. Data routing may be performed by data router 606, data synchronizer 614, and/or ingress-API 616. Generally speaking, data router 606 may route incoming data, after the performance of extraction, such that the data is appropriately forwarded to a target or recipient subcomponent within system 600. In particular, data router 606 may determine whether incoming data will be properly routed to a remainder of system 600 or, instead, whether such data is more properly routed elsewhere (e.g., elsewhere within OSP 598). Data synchronizer 614 may synchronize the release of data at one or more predetermined schedules to further optimize performance. Accordingly, data synchronizer 614 perform a step 607, a step 609, and/or step 617, as further shown in this figure, which help to ensure that data is released and/or routed according to one or more schedules established by data synchronizer 614. Furthermore, as shown, at step 613, data synchronizer 614 can upload corresponding data to a cloud data storage bucket 618, which may be associated with an ingress-API 616.

For simplicity and ease of discussion, the diagram shown in FIG. 6A has extracted a data layer 622 from the remainder of system 600 and set it aside at the bottom of this figure, as shown, to help illustrate how a single unified data layer has been established as a centralized and/or canonical source of data, which can be referenced by any other suitable one of the subcomponents shown within system 600. Accordingly, even when one or more of these subcomponents appears to be redundantly shown in the corresponding diagram (invoice API 640 and invoice API 624 appear to be redundant), this merely reflects the fact that effectively the same subcomponent is being referenced twice: (i) once within data layer 622 as part of the centralized and canonical source of information that is referenceable by the remainder of system 600 and (ii) once again in line and more integrated within the overall workflow corresponding to system 600 as data proceeds to the various subcomponents of the system, as described in more detail below.

As further shown in this figure, data layer 622 may include an invoice API 624, a batch API 626, a validation API 628, a tax workflow API 630 for registrations, a report data API 634, and/or a tax workflow API 636 for filing periods. Invoice API 624 may provide an interface for inputting, parsing, and/or referencing corresponding invoices. Batch API 626 may provide an interface for identifying and/or processing batches of information, such as batches processed in parallel. Report data API 634 may provide an interface for reporting one or more instances of generated or calculated data to an end-user or customer, as discussed in more detail below. Tax workflow API 630 may provide an interface for facilitating the registration of users with system 600. Tax workflow API 626 may provide an interface for identifying, calculating, monitoring, and/or reporting corresponding windows of time associated with tax reporting periods.

The remaining subcomponents shown within FIG. 6A help to complete the process of appropriately routing data that was initiated by data router 606. Ingress data queue processor 620 receives corresponding data, through a send event 617, from cloud bucket 618, and in response can perform a number of different actions. Ingress data queue processor 620 can, at step 619, query linked data from data layer 622. Ingress data queue processor 620 can furthermore, at step 621, insert a batch into an invoice store event, as shown. In particular, at step 623, ingress data queue processor 620 can create a batch of items of information for subsequent processing by a remainder of system 600. The batch of items of information can be received by a batch API 638. Additionally, ingress data queue processor 620 can, at step 625, store records in an invoice store, which can be received by an invoice API 640.

After the process of appropriately routing data, as further discussed above, system 600 may proceed to perform data validation, which can be discussed in more detail in connection with FIG. 6B. In particular, a validation process 652, a validation process handler 654, a validation processor 656, and a validation API 658 can collectively interact and coordinate, as shown, to appropriately validate data received from data router 606. Generally speaking, validation can refer to the process of applying one or more rules to incoming data in order to evaluate whether the incoming data satisfies the one or more rules by having a particular type or format. For example, incoming data of "$5" would satisfy rules expecting incoming data to have a type or format for a dollar amount, but would not satisfy rules expecting incoming data to have a type or format for a calendar date, whereas "08/03/2023" would constitute incoming data that does satisfy rules expecting incoming data to have a type or format for a calendar date. Additionally, or alternatively, the validation rules may specify whether incoming data satisfies one or more tax laws, regulations, and/or other tax-related rules. For example, a jurisdiction may specify tax rules requiring tax returns to have a particular type or format, and may furthermore specify that data populated within fields of these tax returns have a particular type or format. As one illustrative example, the rules may specify that fields may be populated with data having two decimal points of precision while otherwise rounding values up to two decimal points of precision (e.g., "5.437" would be rounded up to "5.44"), whereas other rules may not specify this limitation or may instead specify a different variation of this limitation. Additionally or alternatively, the validation rules may specify, as an ultimate conclusion, whether incoming data indicates overall tax compliance or not (e.g., does the incoming data specify whether the user or customer has submitted sufficient payments to satisfy corresponding tax laws and regulations?).

One of the improvements associated with system 600 includes improvements associated with scalability and/or parallel processing. These improvements may be facilitated by the "batch" subcomponents shown within FIG. 6B. For example, from batch API 638 in FIG. 6A, batch-validation-process-start-handler 646 may receive corresponding batch information and send an appropriate notification to a generic orchestration handler 644. This may initiate, at step 627, a business process management event ("BPMN") according to a workflow and decision automation platform, such as CAMUNDA. The business process management event can be received by a corresponding workflow as a service system 642, which can be implemented according to the workflow and decision automation platform. Generally speaking, workflow as a service system 642 may orchestrate the entirety of system 600, thereby helping to provide a centralized authority or coordinating subsystem, analogous to the central nervous system, that facilitates the performance of method 300 and/or method 321, as well as facilitating the workflow shown within FIGS. 6A-6C. In response, workflow as a service system 642 may trigger batch-validation-process-handler 650 to begin the process of validating data received from the data router, as further discussed above. This may trigger the workflow and interactions shown between validation process 652, validation process handler 654, validation API 658, and validation processor 656, as shown in this diagram.

In particular, in response to validation process 652 receiving the start process command from batch-validation-process-handler 650, validation process 652 may trigger validation process handler 654, at step 637, to get items in a batch, to get corresponding obligations at step 641, and to forward these to validation processor 656, which may furthermore retrieve or extract the corresponding data from cloud storage at step 643, thereby generating tax content 660. Validation process handler 654 may furthermore, at step 639, create a validation outcome, at step 639, which may be forwarded to validation API 658. Upon the completion of the validation process, as step 629, batch-validation-process-complete-handler 648 may forward the corresponding notification to generic orchestration handler 644, which may furthermore notify workflow as a service system 642, thereby enabling the subsystem to proceed to the next instance of high-level functionality associated with system 600, as discussed further below.

After data validation is performed by system 600, the next instance of high-level functionality associated with system 600 according to the workflow shown in these diagrams is form generation. As further shown in FIG. 6B, a number of different subcomponents within system 600 may interact and/or coordinate to achieve the performance of form generation. These subcomponents may include return-generator-external-task-handler 662, return-generator-external-complete handler 664, return generation process 666, return generation handlers 668, and report data API 672. In particular, at step 633, return-generator-external-task-handler 662 may receive an instruction or indication to generate a corresponding return from workflow as a service system 642. Accordingly, return-generator-external-task-handler 662 may thereby instruct return generation process 666 and return generation handlers 668 to initiate the process of preparing a corresponding return. As part of this process, return generation handlers 668 may, at step 645, store reconciliation data, as discussed in more detail below, as well as generate tax content 660 at least in part by referencing a calculation client 670. Return generation handlers 668 may generate a corresponding report, at step 647, which can furthermore be reported by report data API 672. As shown, at step 649, return generation handlers 668 can furthermore get customer tax numbers and reporting documents as part of the process of preparing corresponding tax returns. Generally speaking, report data API 672 reports generated data to a corresponding customer or user, and this data can include reconciliation data, report data, tax returns, etc. As further shown in FIG. 6B, the process of generating a corresponding tax return may involve one or more instances of notifications to, and/or communications with, subcomponents shown within FIG. 6C, and these subcomponents can help perform calculations and other action steps to facilitate the completion of generating a corresponding tax return. After completing a corresponding tax return, return-generator-external-complete-handler 664 may, at step 635, notify workflow as a service system 642 that the tax return has appropriately been completed.

FIG. 6C shows the remaining subcomponents of system 600 that may facilitate the performance of method 300 and/or method 321 at least in part by calculating corresponding values and/or populating corresponding fields of tax returns. Thus, after the initiation of preparing a corresponding form, such as a tax return, as discussed above, system 600 may proceed, according to the workflow shown in these diagrams, to the instance of high-level functionality associated with calculation, which can generally be performed using a centralized common calculation interface 686. Common calculation interface 686 may include an OSS ("One-Stop Shop) calculation 692, a tax calculation 694, an EC ("European Commission") calculation 696, an SAF-T ("Standard Audit File for Tax") calculation 698, and/or an Intrastat calculation 603, each of which may be associated with a corresponding instance or type of tax calculation, as understood by those having skill in the art. Moreover, these examples are merely illustrative and, in other examples, calculation interface 686 may furthermore specify one or more additional types of tax calculations. Common calculation interface 686 can receive the calculation request and store a corresponding result at step 661, and may furthermore download a corresponding reconciliation report, at step 663, which can furthermore facilitate the performance of these various calculations. Reconciliation reports will be discussed in more detail below in connection with FIGS. 7A-7B and 8A-8B.

The remainder of FIG. 6C illustrates how the remaining subcomponents can facilitate the final instance of higher-level functionality associated with system 600, which is actually filing or submitting the corresponding tax return and/or associated payment or resources associated with the tax return. Form service 684 can retrieve the corresponding tax return document, at step 659, from return generation handlers 668. At step 657, tax workflow 682 can store corresponding documents that have been completed using calculations completed by common calculation interface 686. Upon completion, automated filing subcomponents 678 may get the completed tax return at step 653 and store, at step 655, the filing receipt, thereby reflecting the fact that, at step 651, automated filing subcomponents 678 filed the corresponding tax return with a tax authority 680.

FIGS. 7A-7B and FIGS. 8A-8B show illustrative examples of reconciliation reports that can enhance the functionality associated with system 600. In particular, without the enhancements of the reconciliation reports associated with these figures, system 600 may perform a variety of different calculations to complete tax return documents by appropriately completing or populating the fields within those documents. For example, system 600 might sum up a large series of different numbers, such as transaction amounts, thereby generating a total aggregated amount, which may be populated within a field of the corresponding tax return document. Nevertheless, the tax document itself might not necessarily reflect each of the large number of underlying calculations that were used to generate the eventual or ultimate total aggregated amount. Despite this obstacle, it can still be helpful to end-users or customers for them to be able to audit, or facilitate the auditing or other inspection, of tax return documents by demonstrating through evidence exactly which sequence of specific calculations or other determinations were used to generate a particular finalized or ultimate value. For example, rather than simply reporting the total aggregated amount associated with a multitude of transactions, it would be helpful to provide a centralized and/or canonical record of the underlying transactions, thereby enabling one or more tax authorities to subsequently review, and audit, tax return documents to ensure that the values actually populated into these documents are correct, accurate, and/or compliant with the law.

More generally, it can be helpful if the reconciliation report specifies amounts of multiple underlying transactions on which at least one of the values from the values automatically populated into the tax returns or electronic data sheets is based. As described above, these underlying transactions may not be specified within the tax returns or electronic data sheets themselves. Accordingly, the reconciliation reports may enable a more complete audit or inspection procedure to be performed.

Figure 8B:
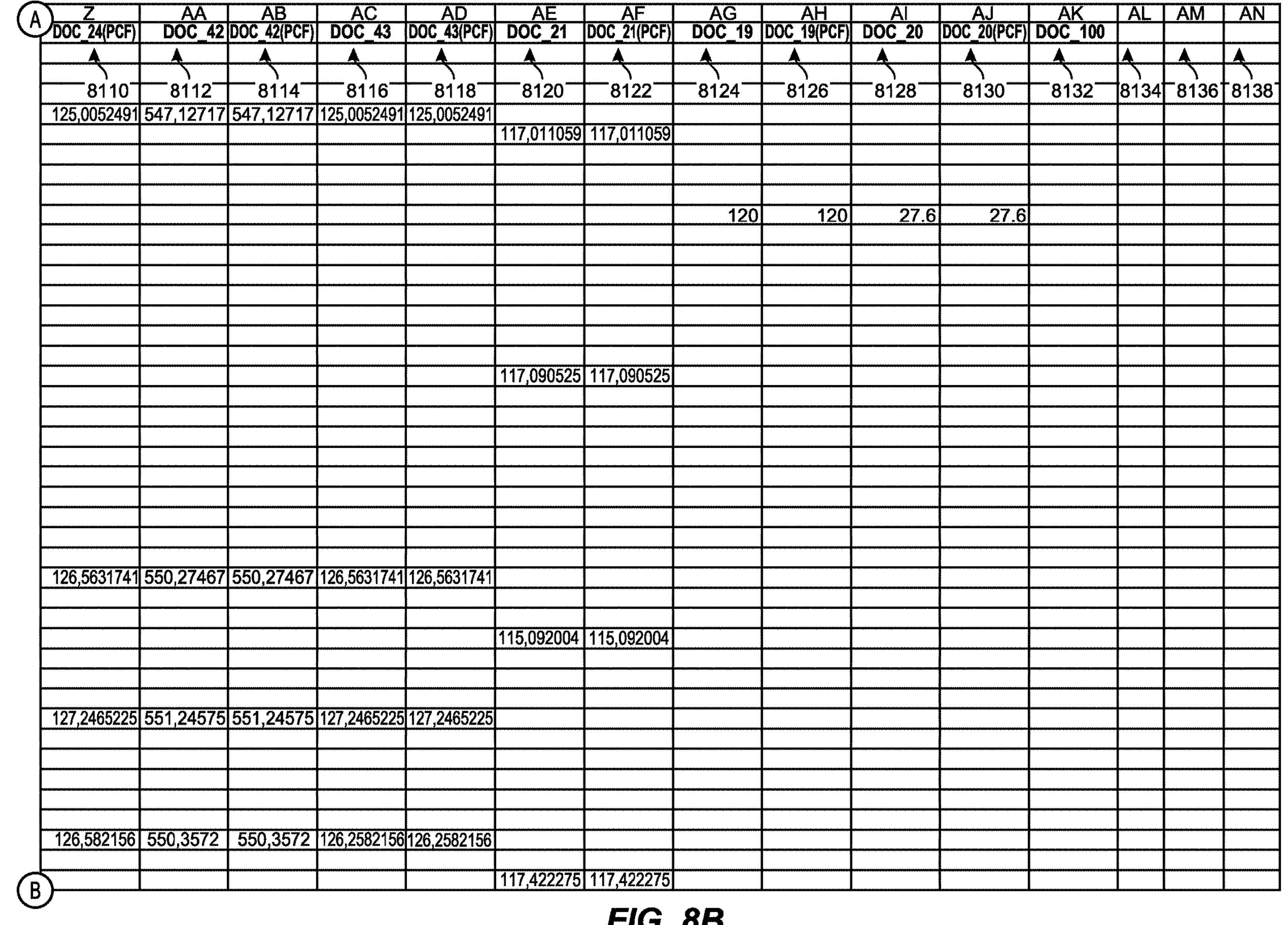

As shown, FIGS. 7A-7B may include rows 700-784 and columns 786-7118, and FIGS. 8A-8B may include rows 800-884 and columns 886-8138. FIG. 7A-7B illustrate how, within these reconciliation reports, individual transactions can be recorded on a transaction-by-transaction basis. In particular, column 786 specifies a type of event, which is always "transaction" in this example, and column 788 specifies the particular invoice number for each of these transactions. Accordingly, each separate transaction that a different seller, marketplace, vendor, etc., performs can be recorded and tracked within a corresponding reconciliation report, consistent with the example of these figures. Although not every single column of these example reconciliation reports is necessary to a full understanding of the overall inventive insight associated with these reports, FIGS. 7A-7B further illustrate how different columns may record other items of relevant or associated information, which can be reported back to an end-user customer as part of the reconciliation report. These items or attributes of information may include the originating country associated with the transaction, the tax calculation date, the currency with which an invoice was specified, the currency exchange rate, the customer name, the supplier name, and/or one or more categories or identifiers of tax codes, such as VAT tax codes (see columns 790-7118). As understood by those having skill in the art, one or more of these different items of information may be optional or potentially excluded from such a reconciliation report, and furthermore one or more items of additional information may be inserted or enhanced within the reconciliation reports, as desired or appropriate.

In contrast to the reconciliation report associated with FIGS. 7A-7B, the reconciliation report associated with FIGS. 8A-8B illustrates how a finalized, total, and/or aggregate value may be calculated using an underlying series of calculations, which can furthermore be recorded within the corresponding reconciliation report. By way of illustrative example, column 8120 in FIG. 8B shows four different instances of total or aggregate numbers, which can correspond to finalize numbers reported by, or populated into, corresponding tax return documents. Nevertheless, using business logic and/or linking procedures within the spreadsheet, these finalized values can be calculated from an underlying series of base values, such as any one of the series of value shown along columns 8102-8118. The particular values, linking procedures, and/or rules associated with these spreadsheets are not particularly relevant for the purposes of this example, in order for the reader to understand that the reconciliation reports of these figures enable a user, customer, and/or tax authority to appropriately audit tax return documents by referencing canonical and/or centralized records of transactions, line by line. These reconciliation reports thereby further enable the tax authority to verify exactly how particular calculations were made and furthermore to verify whether these particular calculations are compliant with the law and/or other regulations.

Figure 9:
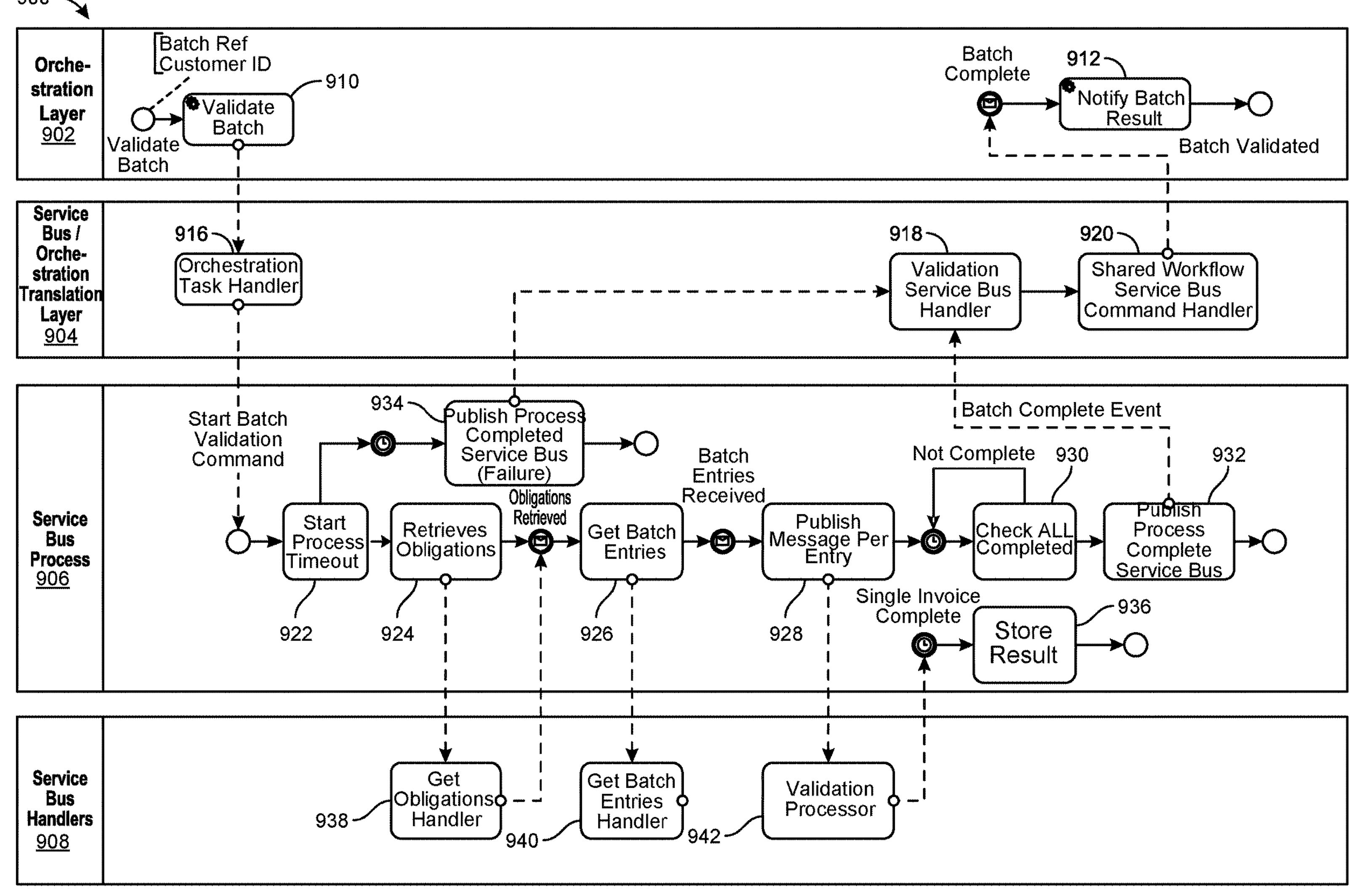
FIG. 9 shows a workflow diagram that helps to illustrate, in the context of the filing engine of FIG. 1, example interactions between an orchestration layer, a translation layer, a service bus process, and a service bus handler.

FIG. 9 shows a diagram 900 of an example subsystem, in terms of implementation details, for executing the data validation high-level functionality that was further discussed above. As further shown in this figure, the more detailed implementation of diagram 900 generally involves the interactions, and coordination, between an orchestration layer 902, a service bus/orchestration translation layer 904, a service bus process 906, and/or service bus handlers 908. As outlined above, orchestration layer 902 may be implemented through a workflow and decision automation platform such as CAMUNDA. Orchestration layer 902 may initiate the corresponding workflow by referencing a batch reference customer identifier and a command to validate a corresponding batch of information, as indicated by validate batch subcomponent 910. At this stage, the corresponding workflow may proceed to orchestration task handler 916, which may be implemented within service bus/orchestration translation layer 904. Service bus/orchestration translation layer 904 is generally responsible for translating data, instructions, and/or commands between orchestration layer 902 and service bus process 906, as further shown in this figure. Accordingly, service bus/orchestration translation layer 904 can furthermore forward the start batch validation command to service bus process 906, which may begin a series of steps to be performed in order to validate incoming data.

In particular, service bus process 906 may initiate a timer for detecting whether a batch validation procedure has timed out at step 922. Subsequently, at step 924, service bus process 906 may retrieve obligations from service bus handler 908 using get obligations handler 938. Alternatively, if the process has timed out, then at step 934, service bus process 906 can publish the fact that the process completed in a stage of failure, which can furthermore be reported to validation service bus handler 918.

At step 924, service bus process 906 can retrieve obligations using get obligations handler 938, resulting in the successful retrieving of obligations. The successful retrieving of obligations can trigger the step of getting batch entries at step 926 using get batch entries handler 940. At step 928, service bus process 906 can publish a message for every entry of the batch entries using validation processor 942. In the case of a single invoice that has been completed, the result can be stored at step 936. Alternatively, if more than a single invoice is being processed then service bus process 906 can check that validation of all corresponding invoices and/or items of data has been successfully completed at step 930. In that case, service bus process 906 can publish a notification that the validation process is completed at step 932, and this notification can be reported to validation service bus handler 918, which can furthermore share this information with shared workflow service bus command handler 920. Shared workflow service bus command handler 920 can notify orchestration layer 902 of the successful completion of the validation of this batch of information. Orchestration layer 902 can, at step 912, notify the result of validating the batch, such as by referencing report data API 672 shown in FIG. 6B.

Figure 10:
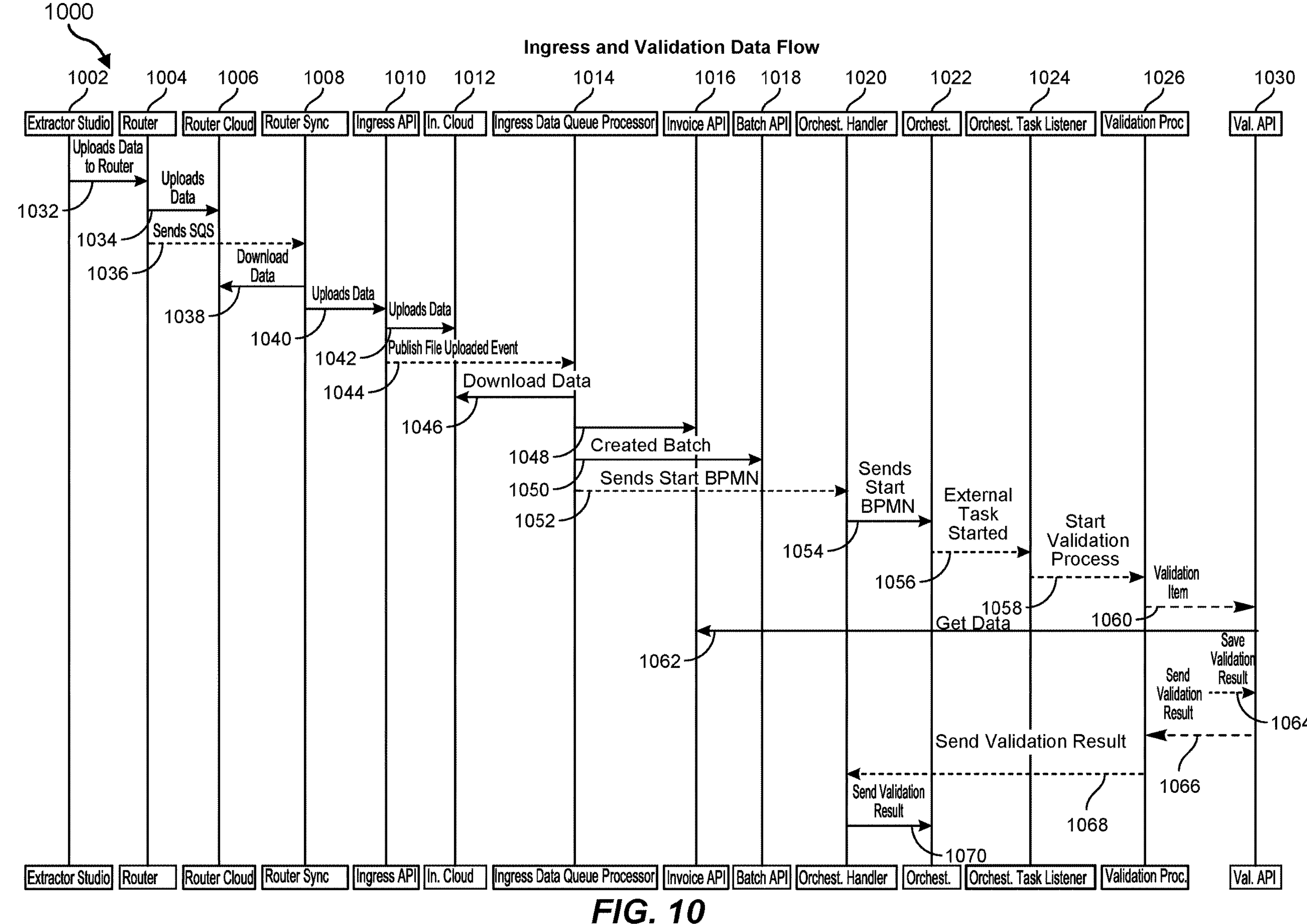
FIG. 10 shows a diagram for an example ingress and validation data flow that elaborates on one or more of the processes corresponding to the workflow diagram of FIGS. 6A-6C.

FIG. 10 further shows a timing diagram 1000 that corresponds to the ingress and validation processing of data shown within FIGS. 6A-6C. Accordingly, timing diagram 1000 further includes references to an extractor studio 1002, a data router 1004, a router cloud subcomponent 1006, a router sync subcomponent 1008, an ingress API 1010, an ingress cloud storage subcomponent 1012, an ingress data queue processor 1014, an invoice API 1016, a batch API 1018, an orchestration handler 1020, an orchestration layer 1022, an orchestration task listener 1024, a validation processor 1026, and a validation API 1030. At step 1032, extractor studio 1002 can upload data to data router 1004. At steps 1034 and 1036, data router 1004 can upload corresponding data to router cloud subcomponent 1006. Router sync subcomponent 1008 may download data, at step 1038, from router cloud subcomponent 1006. Router sync subcomponent 1008 may upload data, at step 1040, to ingress API 1010, which can furthermore upload the data at step 1042, to ingress cloud storage subcomponent 1012. At step 1044, ingress API 1010 can furthermore publish a file uploaded event to indicate that the corresponding file has been uploaded.

At step 1046, ingress data queue processor 1014 may download the data from ingress cloud storage subcomponent 1012. Ingress data queue processor 1014 may subsequently call, at step 1048, invoice API 1016. Invoice API 1016 may provide a programming interface for referencing and parsing data from corresponding invoices. Similarly, at step 1050, ingress data queue processor 1014 may create a batch of corresponding data for processing as a batch. Accordingly, at step 1050, ingress data queue processor 1014 can send an instruction to start the business process management event to orchestration handler 1020. In response, orchestration handler 1020 can, at step 1054, forward the instruction to start the business process management event to orchestration layer 1022, which can furthermore, at step 1036, start an external task, as detected by orchestration task listener 1024 at step 1056. Orchestration task listener 1024 can, in response, start the validation process that was further discussed above at step 1058, by notifying validation processor 1026, which can furthermore, at step 1060, forward an item of validation data to validation API 1030. As further shown in this figure, at step 1064 the result of performing validation procedures can be saved, and at step 1066, the results of the validation procedures can be sent to validation processor 1026. At step 1068, validation processor 1026 can forward the validation result to orchestration handler 1020, which can furthermore forward the validation result, at step 1070, to orchestration layer 1022. Moreover, as further shown in this diagram, in order to perform the validation procedures, validation API 1030 can retrieve, at step 1062, the corresponding data to be validated.

Figure 11:
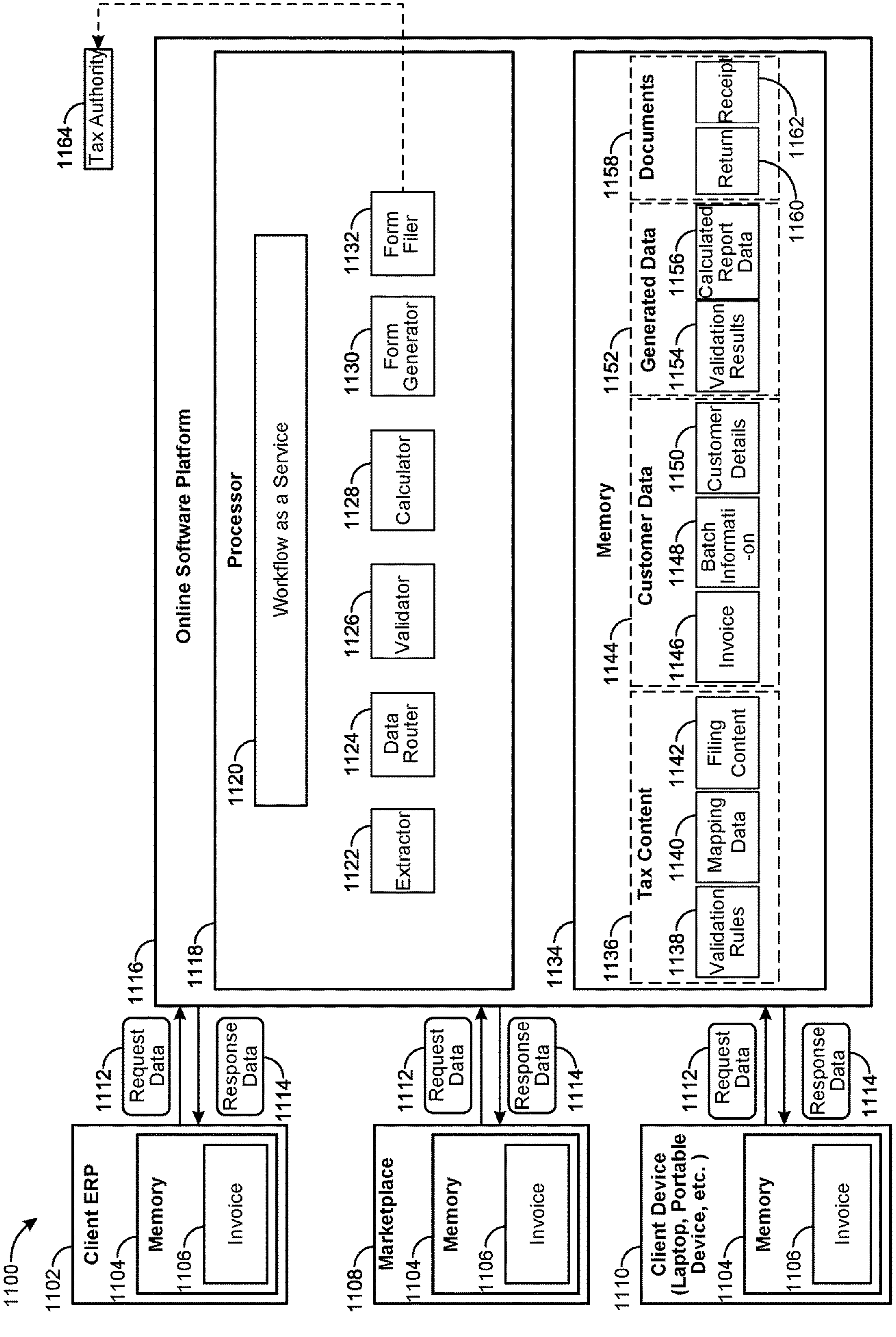
FIG. 11 shows a block diagram for an example online software platform and corresponding network computing systems.

FIG. 11 shows a diagram 1100 that further elaborates on the subcomponents within OSP 598, which is been relabeled as OSP 1116 in this figure. As further shown in diagram 1100, OSP 1116 can interact with a client ERP 1102, a marketplace 1108, and/or one or more instances of a client device 1110. Each of these may include memory 1104 and an invoice 1106. For example, a manufacturer, vendor, or third-party supplier may use client ERP 1102 record and process transaction data for transactions executed using marketplace 1108. One or more instances of client device 1110 may serve as client devices for a customer, which can perform the buying end of a buy-sell transaction. Accordingly, each one of these devices shown in diagram 1100 can request data at a step 1112 and receive data in response at step 1114, as part of one or more of the methodologies outlined above when interacting with OSP 1116.

Diagram 1100 further illustrates how OSP 1116 can include a processor 1118 as well as memory 1134. When properly configured, such as by retrieving memory instructions from memory 1134, processor 1118 can implement a workflow as a service 1120, an extractor 1122, a data router 1124, a validator 1126, a calculator 1128, a form generator 1130, and/or a form filer 1132. Form filer 1132 can file corresponding tax returns with one or more tax authorities 1164, as shown in diagram 1100. Those having skill in the art will recognize that each one of the subcomponents shown within processor 1118 in diagram 1100 has a corresponding or parallel subcomponent within the workflow of FIGS. 6A-6C, for example. Moreover, when processor 1118 executes in order to achieve the functionality associated with its subcomponents, processor 1118 can reference tax content 1136, customer data 1144, generated data 1152, and/or documents 1158. Moreover, as shown, tax content 1136 may include validation rules 1138, mapping data 1140, and filing content 1142; customer data 1144 may include one or more instances of an invoice 1146, batch information 1148, and/or customer details 1150; generated data 1152 may include validation results 1154 and/or calculated report data 1156; and documents 1158 may include one or more instances of a return 1160 and/or one or more instances of a receipt 1162. For example, validator 1126 may reference validation rules 1138 in order to generate validation results 1154. Form generator 1130 may reference mapping data 1140 and/or filing content 1142 in order to generate return 1160 and/or receipt 1162, which can be furthermore reported to the user as calculated report data 1156. Moreover, when performing any one or more of the above-described processes, the subcomponents shown within processor 1118 may appropriately reference invoice 1146, batch information 1148, and customer details 1150, consistent with the discussion above of the workflow shown in FIGS. 6A-6C.

Figure 12:
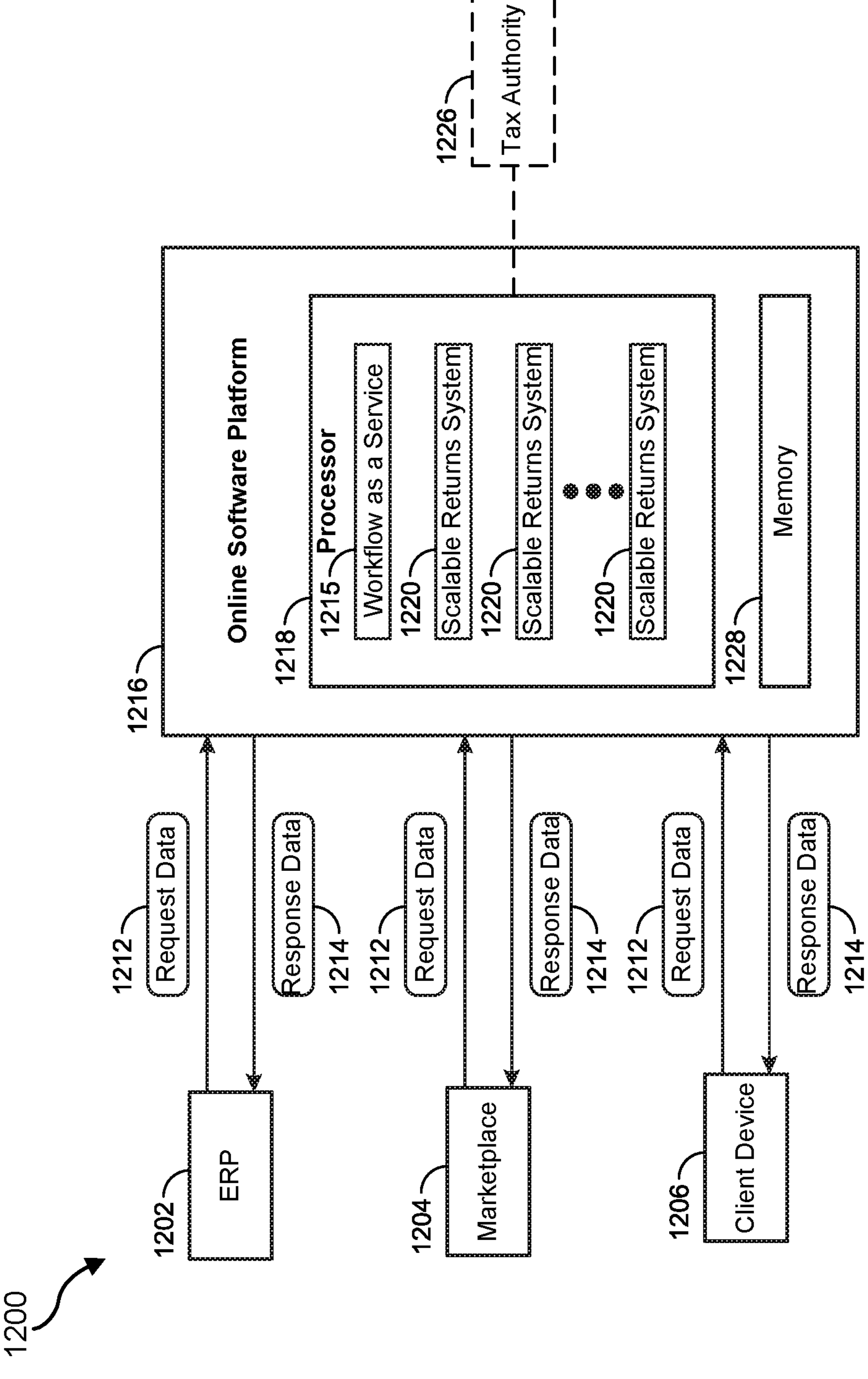
FIG. 12 shows another block diagram for an example online software platform that is configured for improved scalability and mass parallel processing.

For completeness, FIG. 12 shows a diagram 1200 that corresponds to a simplified version of diagram 1100. Accordingly, diagram 1200 may include an OSP 1216, an ERP 1202, a marketplace 1204, and a client device 1206. OSP 1216 can communicate with the remaining devices through one or more instances of request data 1212 and response data 1214, as shown. Moreover, OSP 1216 can furthermore include a processor 1218 and memory 1228. Notably, for the purposes of FIG. 12, processor 1218, when appropriately configured, can execute workflow as a service 1215, which can orchestrate the interactions and/or coordination between multiple instances of the scalable returns system 1220. In this particular figure, there are three separate instances of scalable returns system 1220. Moreover, the dot-dot-dot shown within processor 1218 further indicates that these three instances of scalable returns system 1220 correspond to an arbitrary number for the purposes of illustration. In fact, the overall system corresponding to system 600 of FIGS. 6A-6C can be scalable to an arbitrarily high size simply by adding and/or multiplying components, including the subcomponents of processor 1118 that is shown within diagram 1100.

By way of illustrative example, if system 600 currently operates 64 parallel courses (capable of processing approximately 13,000 sellers or tax returns, and 16-20 million transactions in a span of approximately 3-4 hours), any one of the components of system 600, such as the extractor, data router, validator, calculator, form generator, form filer, etc., may be multiplied to increase the number of parallel courses that can be operated. In some embodiments, a component of system 600 is multiplied, and in some embodiments the entirety of system 600 can be multiplied, as shown in FIG. 12, to increase throughput. For example, 64 parallel courses can be multiplied to 128 parallel courses, which in turn can be increased to 256 and further to 512, and so on, such that the system is scalable. Parallel courses can refer to the number of customers whose returns can be processed concurrently. There are no necessary constraints on the number of sellers or transactions that the system can process through.

In addition to the overall discussion of system 600 and the corresponding workflow of FIGS. 6A-6C, this disclosure also describes risk-reduction technology that may avoid contacting and/or interfering with users, clients, and/or customers, with respect to requests for payment and/or resources, when system 600 has been enhanced with intelligence to determine that payment may be performed on behalf of the user, without contacting or interfering with the user, because the user is trusted to subsequently compensate one or more systems, applications, entities, or other parties that is performing the payment on behalf of the user. This risk-reduction technology as discussed in more detail below in connection with FIGS. 13-14.

Figure 13:
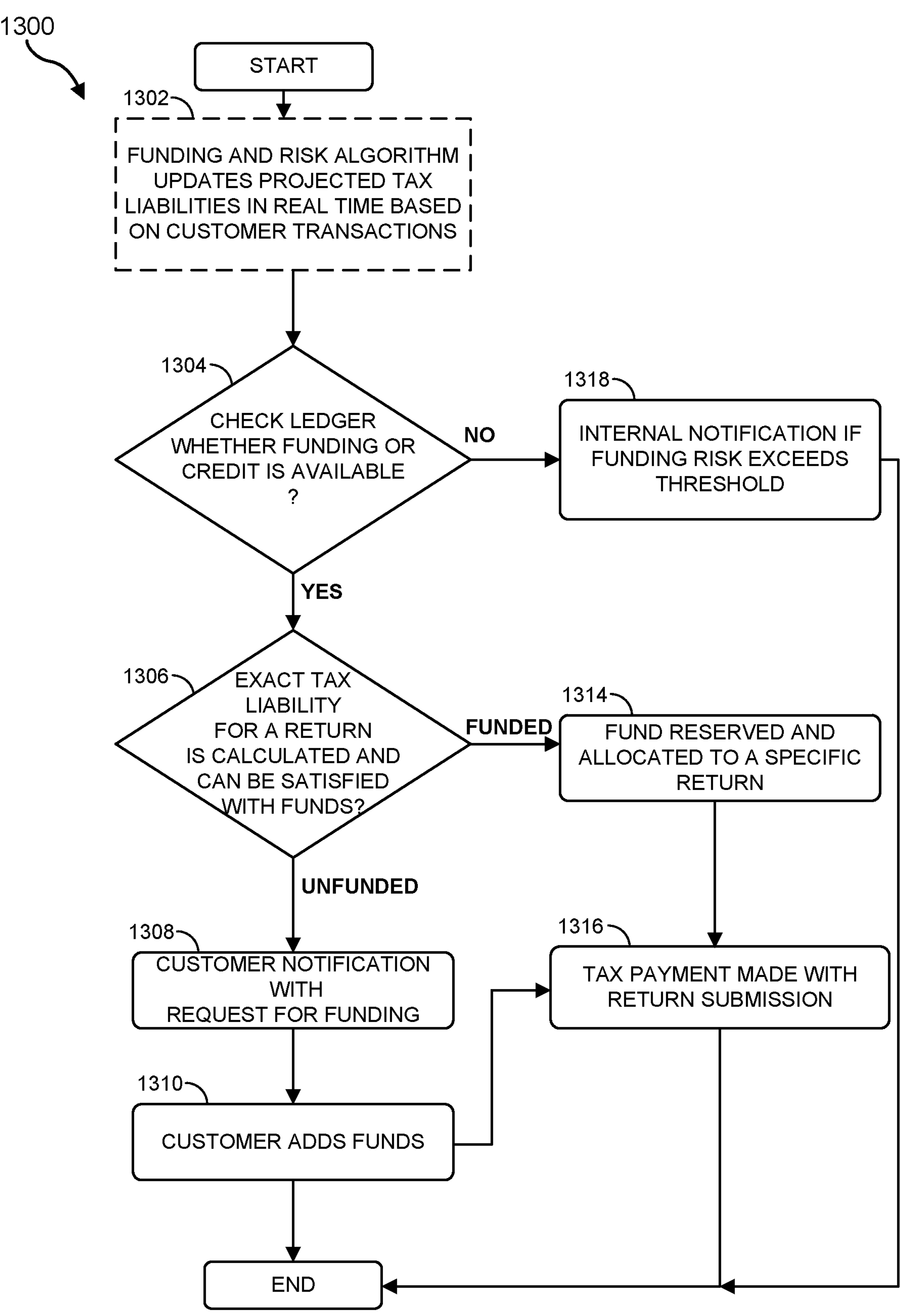
FIG. 13 shows a flow diagram for an example method to be performed by risk-reduction technology in the context of the filing engine shown in FIG. 1.

FIG. 13 shows a flow diagram for a method 1300 for reducing risk when making payments, such as tax payments, within the context of the workflow shown within FIGS. 6A-6C. As shown in this figure, method 1300 may begin at step 1302, at which point a funding and risk algorithm can update a projected tax liability, such as a VAT tax, based on data regarding customer transactions. In other words, well prior to the time when finalized tax returns and/or payments need to be actually submitted, at a first stage of method 1300, a funding and risk algorithm can generate a projected tax liability that will provide a rough preliminary estimate that, although potentially imprecise, imperfect, and/or based on incomplete data (e.g., because all the transactions associated with the particular return, or all of the transactions covering a particular span of time, have not actually occurred or have not actually been recorded yet) may nevertheless provide utility when a system, such as system 600, determines whether to make payments on behalf of the customer. The projected tax liability may also prove to be useful for system 600 itself, and/or its administrators, when trying to determine what to request of users and/or customers. For example, the projected tax liability of step 1302 may enable system 600 and/or its administrators, etc., to make earlier, more intelligent, more accurate, and/or more useful requests from users for information, even when in the middle of a tax reporting period and well prior to the completion of that period at which point a more complete and finalized tax return can be prepared, as discussed in more detail below.

From step 1302, method 1300 may proceed to a decision step 1304, at which point system 600 may check a ledger for whether funding or credit is available to cover the projected tax liability calculated at step 1302. This may correspond to the second part of the first stage of method 1300, which is based on the projected tax liability as a rough estimate rather than the more exact and accurate calculation that can be prepared and reported at the end of a tax reporting period. At decision step 1304, the reference to funding can refer to funding that (i) system 600 knows the user already possesses and can submit readily and/or (ii) funding that the user has already submitted to system 600 and/or an intermediary in escrow such that the funding is reserved safely and can be used to cover any future tax liabilities corresponding to the projected tax liability. Additionally, or alternatively, the reference to credit at decision step 1304 can refer to credit that system 600 has, when enhanced with risk-reduction intelligence, ascertained or evaluated as applicable to the user based on one or more items of evidence indicating credit worthiness, as discussed in more detail below. In various examples, instances of funding and/or credit can be combined, as appropriate or desired, to determine whether a user will be expected to appropriately cover projected and/or exactly calculated tax liabilities.

As a simplified example for illustration purposes, an amount of funding of $10 and an amount of credit of five dollars can be combined for a total available amount of $15 which can create a delta of $5 in a scenario where the projected tax liability at step 1302 is $20. In various examples, the risk threshold of step 1318 can correspond to, be the same as, and/or be proportional to an amount of credit ascertained as applicable to a particular user based on one or more items of evidence indicating credit worthiness. Accordingly, in this example, the risk threshold would correspond to $5 greater than the amount of funding that the user has already identified in escrow and/or savings, thereby creating a risk threshold of $15, which is exceeded by the projected tax liability of $20, as discussed above. Those having skill in the art will understand that this simplified example uses relatively simple and static rules or values, and more sophisticated versions of the risk-reduction technology may allocate or assign credit on a more dynamic basis.

If the decision is no at decision step 1304, then at step 1318, an internal notification can be transmitted indicating that the risk exceeds a corresponding threshold. This internal notification can also optionally be transmitted to the user as well for informational purposes.

Returning to the main branch of method 1300 in this flow diagram, from decision step 1304 method 1300 may proceed to decision step 1306, which may correspond to the beginning of the second stage of this overall process. In contrast to the first stage described above, at which point projected tax liabilities were calculated as a rough and/or preliminary calculation, the second stage can occur later in time, such as at the end of a tax reporting window of time, at which point system 600 may need to calculate the exact liability for a return using exact amounts for all associated transactions. Accordingly, at decision step 1306, system 600, when enhanced with appropriate intelligence corresponding to method 1300, can calculate the exact tax liability for a return and then decide whether this exact amount can be satisfied with funding and/or credit. As described above, in this example system 600 may provide credit to the end-user at the first stage of method 1300 as well as the second stage, but in other examples system 600 may only provide the option of credit to the end-user at the first stage. If the answer is yes at decision step 1306, then method 1300 may proceed to a step 1314, at which point system 600 may reserve the appropriate funds and allocate them to a specific return for filing. Subsequently, at step 1316, system 600 may pay the exact tax amount with the corresponding filing of a tax return. Further details of preparing and filing tax returns are discussed above in connection with FIG. 6C, for example.

If the decision is no at decision step 1306, then method 1300 may proceed to step 1308, at which point system 600 may transmit a notification to the customer with a request for funding. At step 1310, the customer may add funds, if available, in order to complete the process of preparing and filing a corresponding return with appropriate payment. Accordingly, from step 1310, method 1300 may proceed again to step 1316, as discussed above. Afterward, method 1300 may end as shown.

Figure 14:
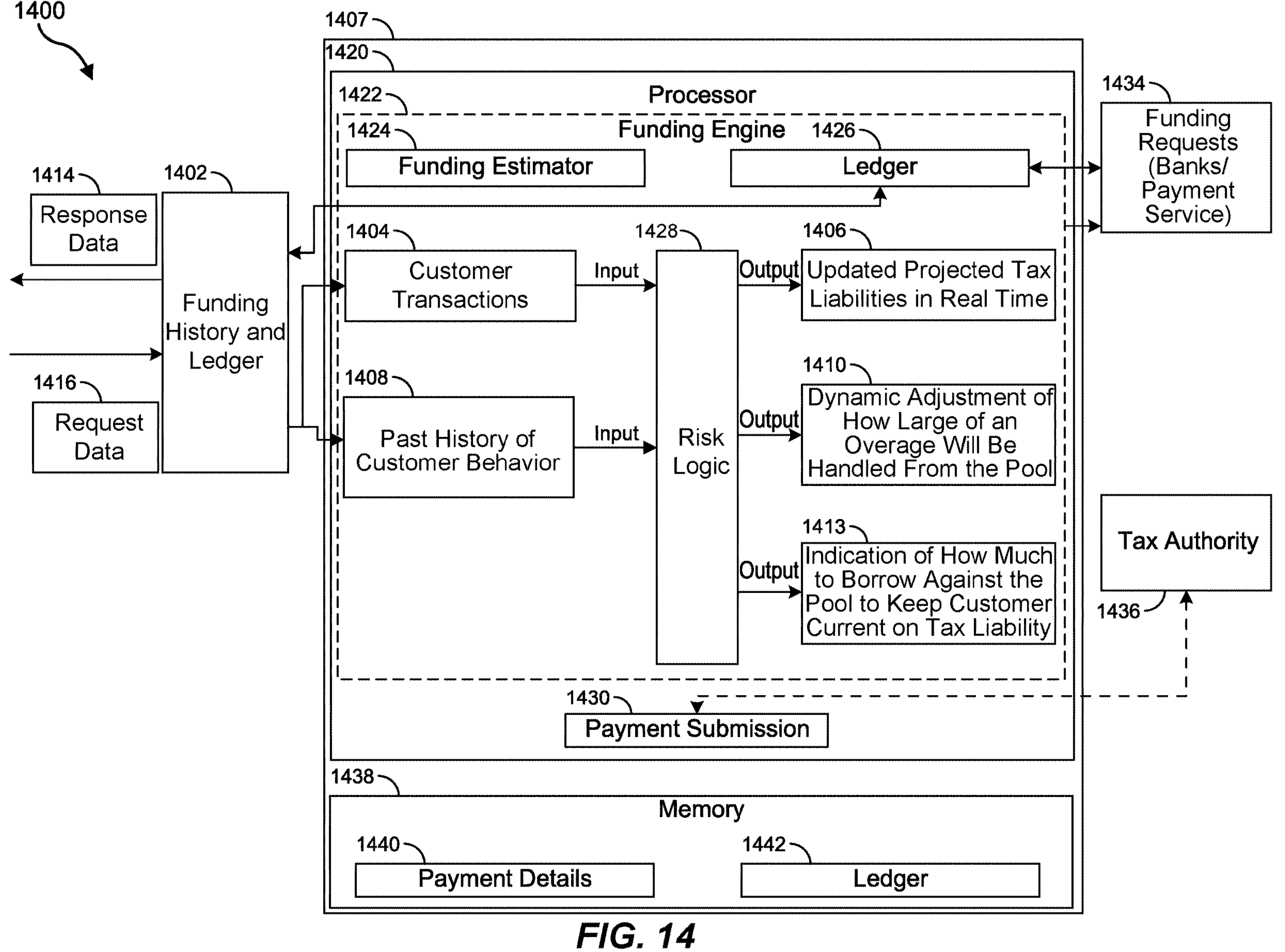
FIG. 14 shows a block diagram of an example embodiment of the filing engine of FIG. 1, which in this case has been optionally enhanced with a funding engine and/or risk logic for the performance of risk-reduction functionality.

FIG. 14 shows a block diagram 1400 that elaborates on funding engine 522 shown in FIG. 5A, including funding estimator 524, ledger 526, risk logic 528, and payment submission 530. Those having skill in the art can ascertain that several subcomponents of diagram 1400 have corresponding subcomponents within FIG. 5A. Additionally, diagram 1400 elaborates on the disclosure of FIG. 5A by further illustrating how different subcomponents within funding engine 1422 may interact and/or coordinate the performance of method 1300.

In particular, diagram 1400 illustrates how funding engine 1422 within an OSP 1407 can, through one or more instances of response data 1414 and/or request data 1416, maintain a funding history and/or ledger 1402. Funding history and/or ledger 1402 may provide a ledger or other record that keeps track of how much funding a user or customer has provided in escrow and/or to a savings pool for the purposes of method 1300. Optionally, funding history and/or ledger 1402 may also provide a record of prior transactions and/or other instances of customer behavior, which can be useful when assessing the credit worthiness of the customer and/or assessing how much credit to extend the customer, which can facilitate the goal of avoiding contacting or disturbing the customer when making minor payments, as further discussed above.

In view of the above, funding engine 1422 may include another instance of funding history and/or ledger 1402, in the form of a ledger 1426, which resides as a copy within funding engine 1422. Similarly, funding engine 1422 may extract, from funding history and/or ledger 1402, data indicating customer transactions 1404, one or more records of past history of customer behavior 1408 and/or data indicating or describing one or more interactions with customers such as a history of behavior. Of course, those having skill in the art will understand that customer transactions 1404 and/or past history of customer behavior 1408 may potentially overlap partially or entirely.

From customer transactions 1404 and/or past history of customer behavior 1408, funding engine 1422 may implement risk logic 1428 that generates one or more outputs, consistent with method 1300, as described above. These outputs may include updated projected tax liabilities in real-time 1406, which can be calculated and/or estimated at step 1302 of method 1300. Additionally and/or alternatively, risk logic 1428 may generate, based on one or more of the inputs shown, a dynamic adjustment of how large of an overage will be handled from the pool 1410. This output can correspond to a credit worthiness assessment that establishes an amount of credit available to the customer, which can correspond to the risk threshold of step 1318 within method 1300, as discussed above. Additionally and/or alternatively, risk logic 1428 can generate an output in the form of an indication 1413 of how much to borrow against the pool to keep the customer current on tax liability. Thus, this latter output can correspond to a scenario where the decision is yes at decision step 1304, the decision is yes due to the availability of credit that was previously ascertained or assigned to the customer based on the funding and risk algorithm executed at step 1302 of method 1300. In other words, if the user has sufficient credit with which to cover exact tax liabilities, then this credit can be actually used or leveraged, in the form of indication 1413 shown in FIG. 14. Diagram 1400 also illustrates how funding engine 1422 can further include a funding estimator 1424, which can generate the estimate of funds needed to cover projected tax liabilities, as described above in connection with step 1302 of method 1300. Funding estimator 1424 can also generate the estimated tax payment amount 518 shown within FIG. 5A and further discussed above.

In the case that there are not sufficient funds, even in combination with credit, to cover projected tax liabilities and/or exact tax liabilities, then funding engine 1422 can reference or issue one or more funding requests 1434 in order to request appropriate resources from the end-user. Additionally, or alternatively, if sufficient funds are obtained, and/or if a partial payment is desired or instructed, then a payment submission component 1430 within processor 1420 may submit appropriate payment to a tax authority 1436. For completeness, diagram 1400 also illustrates how OSP 1407 may include an instance of memory 1438, which may further record and/or store payment details 1440 and/or another copy of the corresponding ledger 1442.

The invention claimed is:

1. A computer system comprising:

at least one processor; and at least one memory coupled to the at least one processor, the at least one memory having computer-executable instructions stored thereon that, when executed by the at least one processor, cause operations to be performed, the operations including:

electronically configuring parameters in accordance with an initial setup by one or more users;

electronically receiving, over a computer network and from multiple different remote systems, electronic records recording interchanges in which one or more additional users participated;

electronically extracting data concurrently from the electronic records, the data specifying the interchanges;

electronically routing the data through a workflow control platform;

electronically validating the data as accurate at a first location controlled by the workflow control platform;

based on the validated data, electronically executing determinations concurrently for generating electronic data sheets associated with resources to be electronically filed with one or more domains;

electronically generating the electronic data sheets associated with the resources concurrently at least in part by automatically populating into electronic data sheets values resulting from the determinations;

electronically filing the generated electronic data sheets with the one or more domains automatically such that further contacting the one or more users for electronically filing the generated electronic data sheets is avoided beyond the initial setup; and generating an electronic reconciliation report that corresponds to the electronic data sheet, in which the generating the electronic reconciliation report includes:

automatically determining which sequence of determinations were used to generate at least one of the values from the values automatically populated into the electronic data sheets;

based on the determined sequence of determinations, determining amounts of multiple underlying interchanges on which at least one of the values from the values automatically populated into the electronic data sheets is based; and causing the reconciliation report to specify the amounts of multiple underlying interchanges on which at least one of the values from the values automatically populated into the electronic data sheets is based.

2. The system of claim 1, in which validating the data as accurate at the first location controlled by the workflow control platform comprises applying one or more rules to incoming data in order to evaluate whether the incoming data satisfies the rules by having a particular type or format.

3. The system of claim 1, in which the multiple underlying interchanges are omitted from the electronic data sheets such that generating the reconciliation report enables an inspection procedure to be performed on the values automatically populated into the electronic data sheets by using the underlying interchanges specified in the reconciliation report.

4. The system of claim 1, in which electronically configuring parameters in accordance with an initial setup by one or more users comprises modifying a user profile for the one or more users by populating the user profile with identifying information submitted by the one or more users.

5. The system of claim 1, in which electronically extracting data concurrently from the electronic records comprises filtering more relevant data from less relevant data.

6. The system of claim 1, in which electronically executing determinations concurrently for generating electronic data sheets associated with resources to be electronically filed with one or more domains is performed at least in part by invoking a common calculation interface that includes a plurality of subcomponents for respective calculations.

7. The system of claim 1, in which the operations further include: electronically reporting completion of the electronic data sheet through a report data application programming interface.

8. The system of claim 1, in which electronically executing determinations concurrently is performed at a second location that is controlled by the system.

* * * * *